US010583868B2

(12) United States Patent
Murata

(10) Patent No.: US 10,583,868 B2
(45) Date of Patent: Mar. 10, 2020

(54) MEMBER MOUNTING STRUCTURE

(71) Applicant: TOYOTA JIDOSHA KABUSHIKI KAISHA, Toyota-shi, Aichi-ken (JP)

(72) Inventor: Soshiro Murata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/116,416

(22) Filed: Aug. 29, 2018

(65) Prior Publication Data
US 2019/0070938 A1 Mar. 7, 2019

(30) Foreign Application Priority Data

Sep. 5, 2017 (JP) .................................. 2017-170542

(51) Int. Cl.
*B62D 27/02* (2006.01)
*B62D 25/02* (2006.01)
*B62D 29/00* (2006.01)
*B23K 20/12* (2006.01)
*B60J 5/04* (2006.01)
*B62D 25/04* (2006.01)
*B62D 25/20* (2006.01)
*B62D 65/02* (2006.01)
*B23K 103/10* (2006.01)

(52) U.S. Cl.
CPC .......... *B62D 27/023* (2013.01); *B23K 20/129* (2013.01); *B60J 5/045* (2013.01); *B62D 25/02* (2013.01); *B62D 25/025* (2013.01); *B62D 25/04* (2013.01); *B62D 25/2027* (2013.01); *B62D 29/007* (2013.01); *B62D 29/008* (2013.01); *B62D 65/024* (2013.01); *B23K 2103/10* (2018.08)

(58) Field of Classification Search
CPC .... B62D 25/02; B62D 25/024; B62D 25/025; B62D 27/2027; B62D 27/023; B62D 29/008; B62D 64/024; B62D 65/024
USPC ...... 296/203.01, 203.03, 193.06, 209, 24, 4, 296/24.42, 24.43
See application file for complete search history.

(56) References Cited

U.S. PATENT DOCUMENTS

2010/0109385 A1* 5/2010 Yamada ................. B62D 25/02
296/209
2019/0161128 A1* 5/2019 Abke ..................... B62D 27/02

FOREIGN PATENT DOCUMENTS

| JP | 2001-287666 A | 10/2001 |
| JP | 2009-173079 A | 8/2009 |
| JP | 2012-111338 A | 6/2012 |

* cited by examiner

*Primary Examiner* — Dennis H Pedder
(74) *Attorney, Agent, or Firm* — Oliff PLC

(57) ABSTRACT

A mounting structure has a front pillar and a side member outer panel. The front pillar has a first linear expansion coefficient. The side member outer panel has a second linear expansion coefficient that is greater than the first linear expansion coefficient. The side member outer panel has a first fastened portion, a second fastened portion, a third fastened portion and a fourth fastened portion that form an imaginary region, and a hinge mounting portion that constrains deformation, due to heating, within the imaginary region, and an unfastened portion. The unfastened portion permits deformation, in an in-plane direction, of a region between the first fastened portion and the second fastened portion.

16 Claims, 14 Drawing Sheets

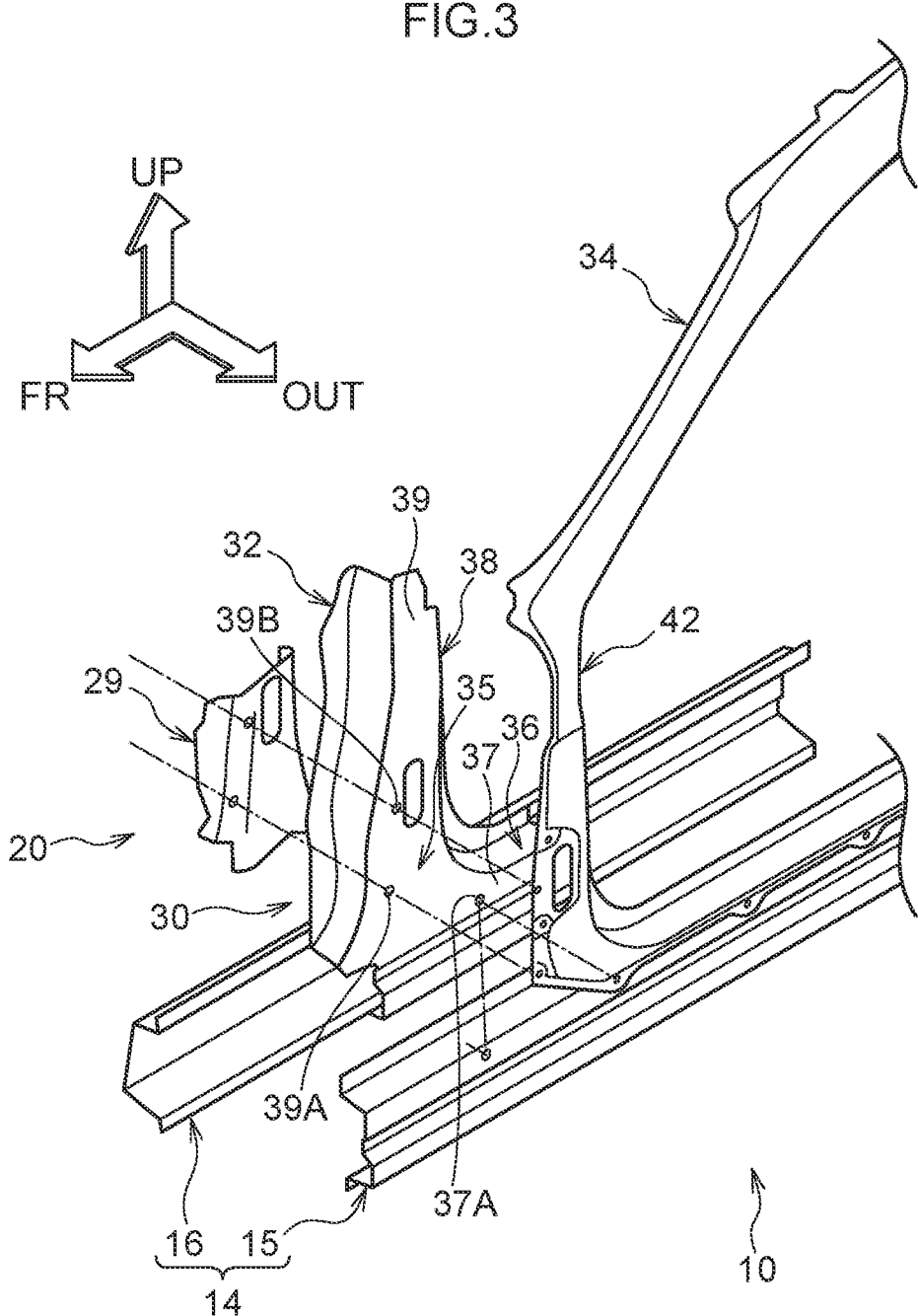

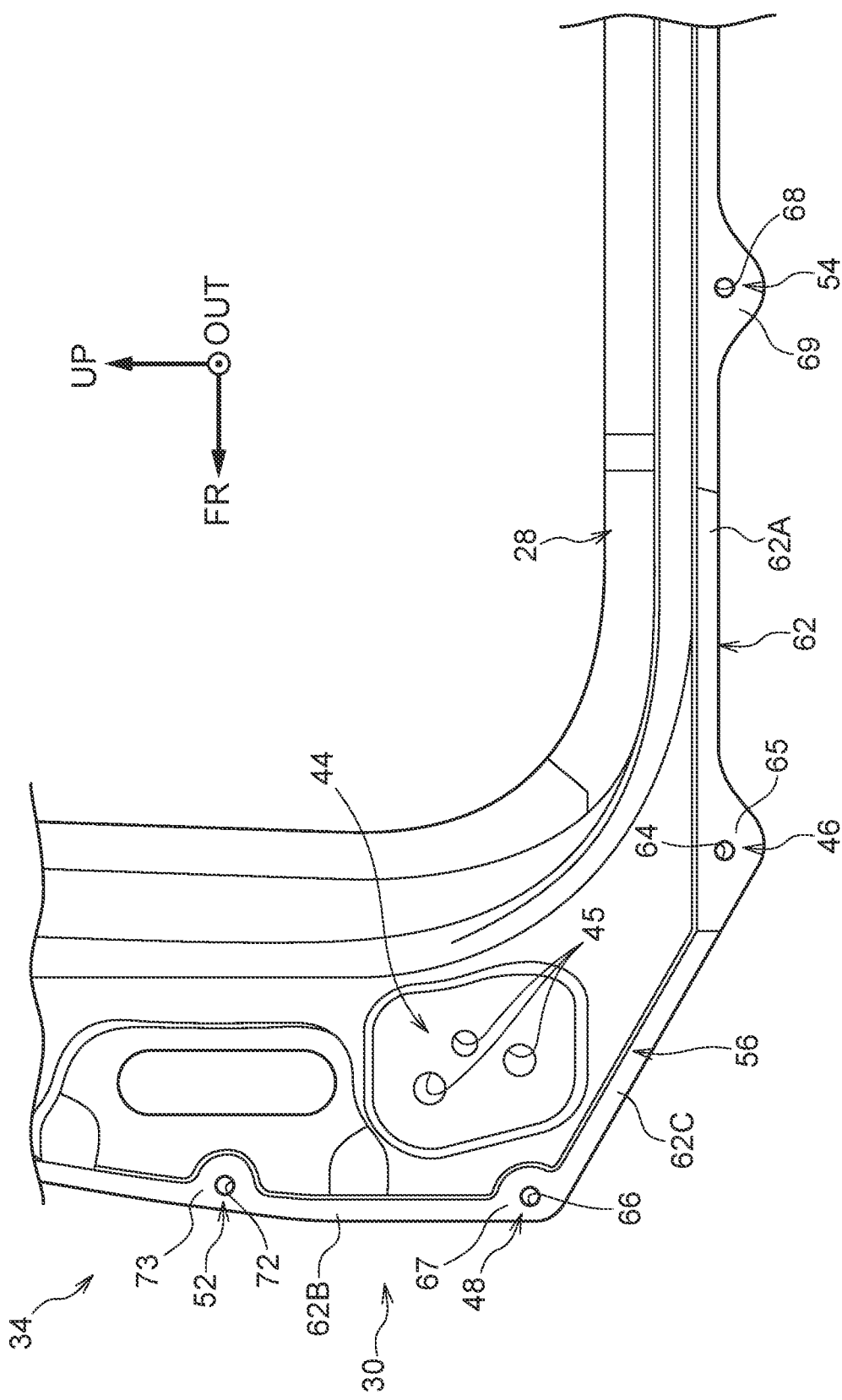

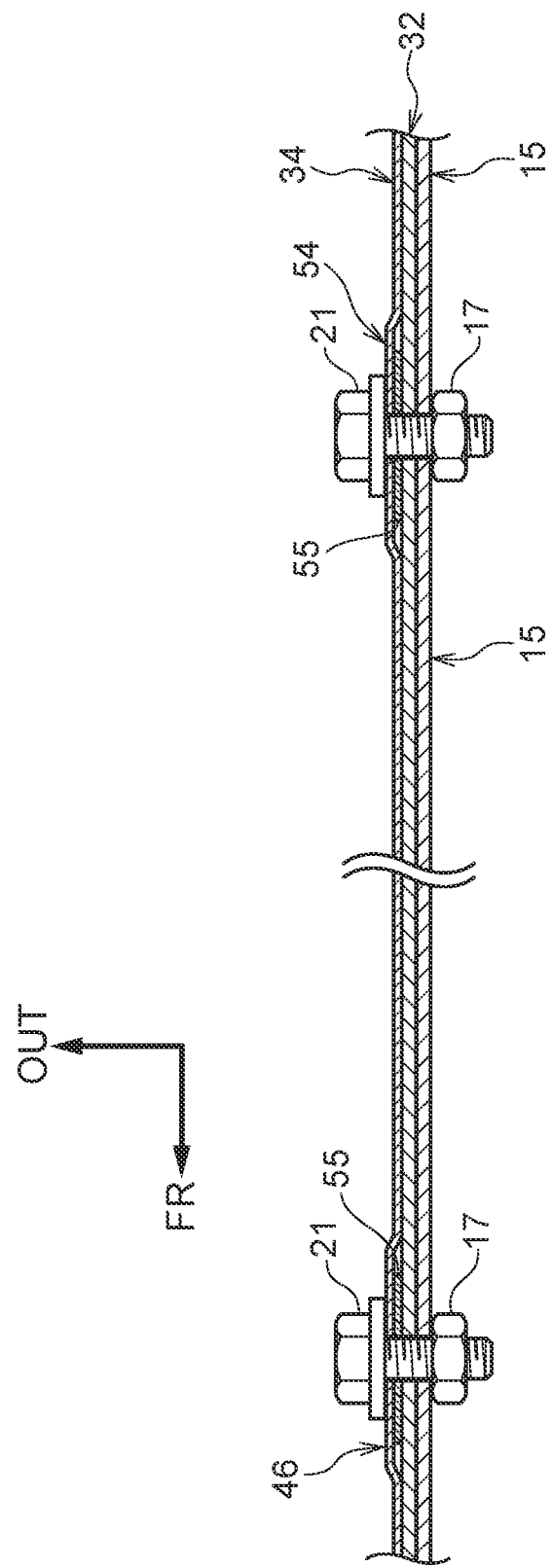

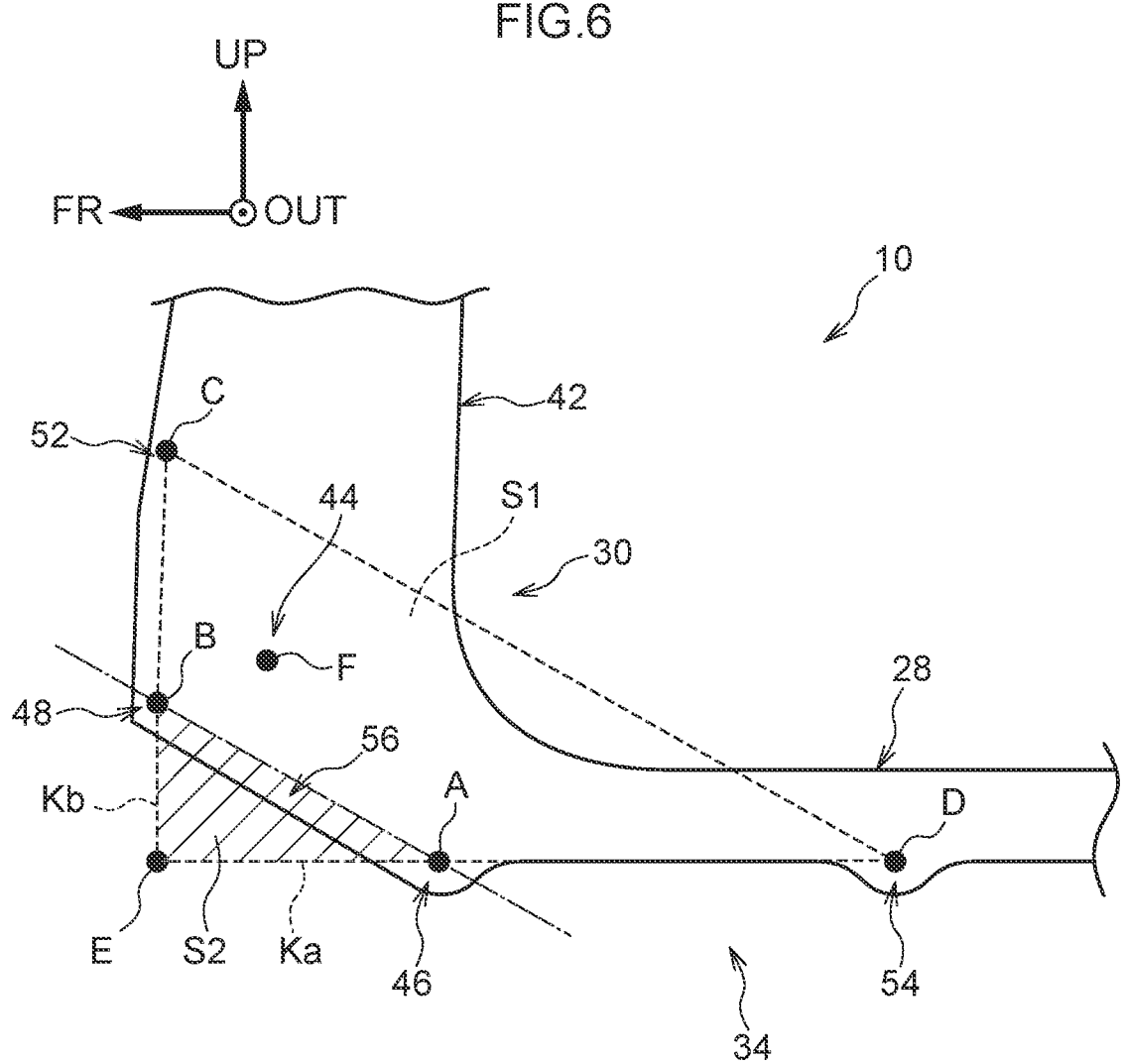

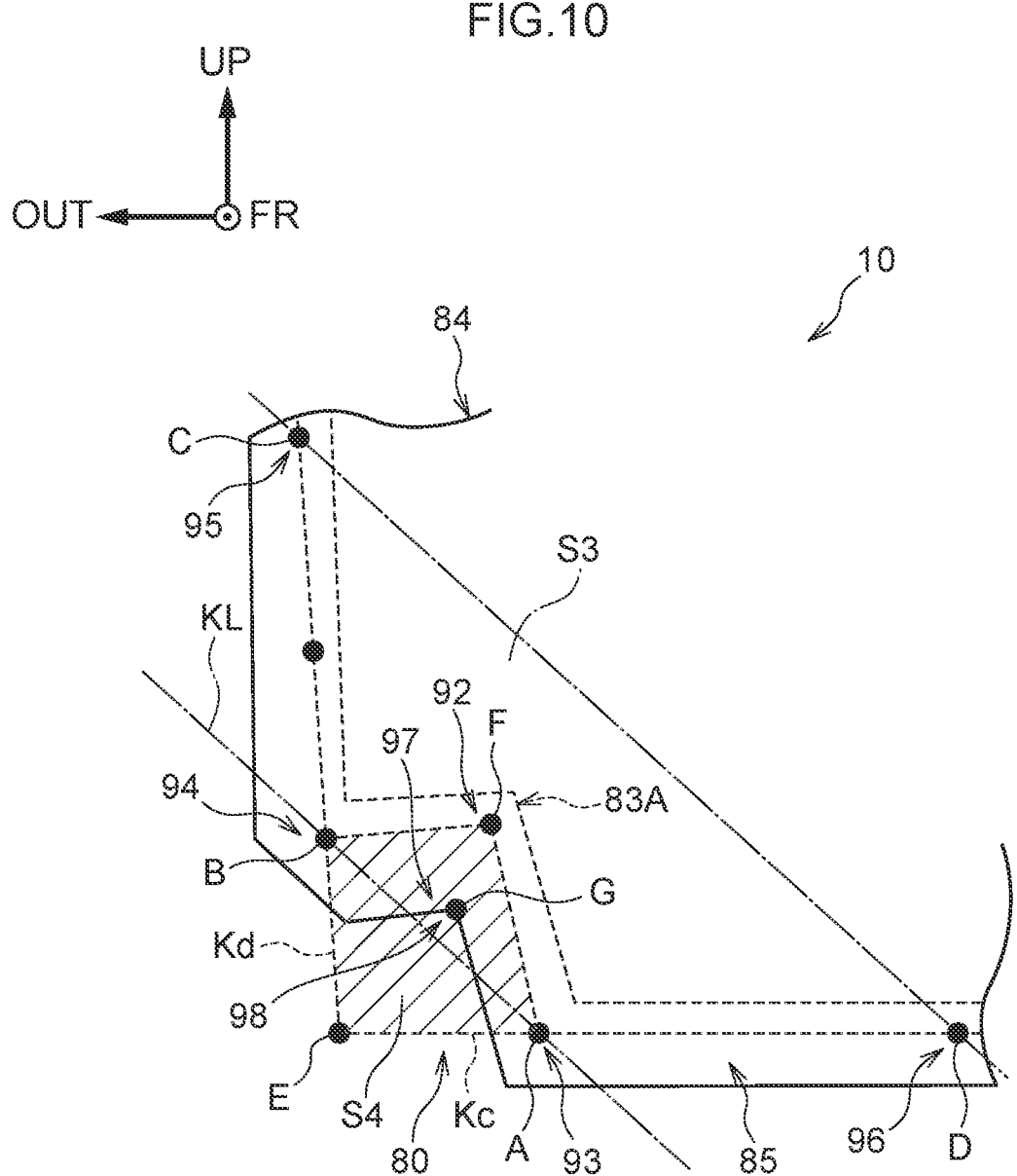

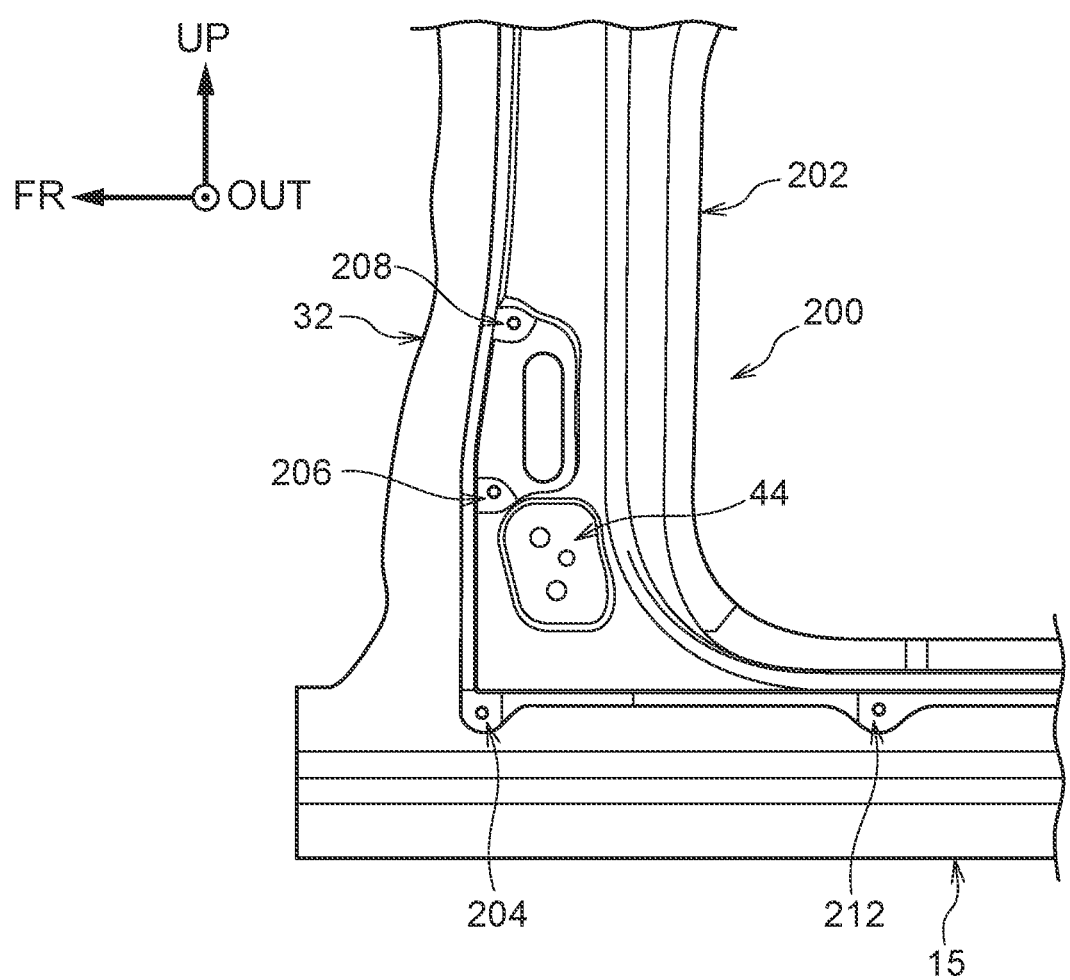

MEMBER MOUNTING STRUCTURE

CROSS-REFERENCE TO RELATED APPLICATION

This application is based upon and claims the benefit of priority of the prior Japanese Patent Application No. 2017-170542, filed on Sep. 5, 2017, the entire content of which is incorporated herein by reference.

TECHNICAL FIELD

The present disclosure relates to a member mounting structure.

RELATED ART

Japanese Patent Application Laid-Open (JP-A) No. 2001-287666 (Patent Document 1) discloses a vehicle body for an automobile in which a cab-side inner-side frame assembly member and a cab-side outer-side frame assembly member, which are made of a magnesium base alloy or are made of an aluminum base alloy, are joined together.

There is a member mounting structure that mounts, to a first member having a first linear expansion coefficient, a second member that has a second linear expansion coefficient greater than the first linear expansion coefficient and that has a constraining portion that constrains deformation due to heating. The constraining portion is disposed at the inner side of an imaginary region that is formed by a first mounted portion, a second mounted portion, a third mounted portion and a fourth mounted portion. In this member mounting structure, when heating is carried out in a drying processing after painting, or the like, due to the difference in the linear expansion coefficients, the second member deforms more greatly than the first member.

At the second member, deformation due to thermal stress is constrained at the constraining portion. However, at regions other than the constraining portion, thermal stress concentrates toward the mounted regions that are mounted to the first member. Therefore, floating of the second member at the peripheries of the mounted regions becomes large. In particular, due to the constraining portion being disposed at the inner side of the imaginary region, it is easy for floating of the second member at the peripheries of the respective mounted regions to become large.

Here, in a structure in which a corner portion of the second member is mounted at one place, the thermal stress that is applied to the peripheral portion of the mounted region is large, and floating of the second member is large. In this way, in a structure that mounts, to a first member having a first linear expansion coefficient, a second member that has a second linear expansion coefficient greater than the first linear expansion coefficient and that has a constraining portion that constrains deformation due to heating, there is room for improvement in suppressing floating of the second member in a case in which the first member and the second member are heated.

SUMMARY

In view of the above-described circumstances, an object of the present disclosure is to provide a member mounting structure that can suppress floating of a second member when a first member and the second member are heated, in a structure that mounts, to the first member having a first linear expansion coefficient, the second member that has a second linear expansion coefficient greater than the first linear expansion coefficient and that has a constraining portion that constrains deformation due to heating.

A member mounting structure relating to a first aspect has: a first member that has a first linear expansion coefficient; and a second member that has a second linear expansion coefficient that is greater than the first linear expansion coefficient, and at which, among a first mounted portion, a second mounted portion, a third mounted portion and a fourth mounted portion that are mounted to the first member and are disposed at four vertices that form a quadrangular imaginary region when a surface of the second member is seen from an out-of-plane direction, at least the first mounted portion and the second mounted portion are disposed at an outer edge portion of the second member, and the second member has a constraining portion, which is disposed at an inner side of the imaginary region and constrains deformation that is due to heating, and a deformation permitting portion that is provided between the first mounted portion and the second mounted portion and that permits deformation, in an in-plane direction, of a region between the first mounted portion and the second mounted portion.

In the first aspect, when the first member and the second member are heated by a painting process or the like, due to thermal stress, the amount of deformation of the second member in the in-plane direction is greater than the amount of deformation of the first member in the in-plane direction. At the second member, deformation due to thermal stress is constrained at the constraining portion, but because thermal stress is applied in the in-plane direction from the constraining portion toward the respective mounted portions, the amount of deformation is large. In particular, because the constraining portion is disposed at the inner side of the imaginary region that is formed by the first mounted portion, the second mounted portion, the third mounted portion and the fourth mounted portion, it is easy for thermal stress to be applied to the respective mounted regions.

Here, at the second member, the mounted regions at the outer edge portion of the second member are at two places that are the first mounted portion and the second mounted portion. Therefore, the thermal stress in the in-plane direction that is applied to the mounted regions of the outer edge portion is dispersed, as compared with a structure in which there is a mounted region at one place. Moreover, the deformation permitting portion of the second member permits deformation, in the in-plane direction, of the region between the first mounted portion and the second mounted portion of the outer edge portion. Due thereto, at the peripheral edge portion of the first mounted portion, the peripheral edge portion of the second mounted portion, and the region between the first mounted portion and the second mounted portion, the amount of deformation of the second member in the out-of-plane direction is small. Thus, floating of the second member when the first member and the second member are heated can be suppressed.

The third mounted portion of a member mounting structure relating to a second aspect is adjacent to the second mounted portion along the outer edge portion, and the fourth mounted portion is adjacent to the first mounted portion along the outer edge portion.

In the second aspect, because the respective mounted portions are disposed at the outer edge portion that floats easily as compared with the inner side, floating of the second member can be suppressed further.

A recessed portion, which is recessed toward an inner side in the in-plane direction, is formed at the deformation permitting portion of a member mounting structure relating to a third aspect.

In the third aspect, the surface area of the deformation permitting portion is small due to the recessed portion being formed thereat. Therefore, even if the region between the first mounted portion and the second mounted portion elongates in the direction in which thermal stress is applied, the deformation permitting portion projecting-out toward the outer side, as compared with the other regions of the second member, is suppressed. Due thereto, a deterioration in the design of the second member can be suppressed.

The first member of a member mounting structure relating to a fourth aspect is a frame member of a vehicle, and the second member is a panel member that is mounted to the frame member.

In the fourth aspect, because the deformation permitting portion is formed at the panel member, deformation of the panel member, which deforms easily at the time of drying after painting, can be suppressed.

The panel member of a member mounting structure relating to a fifth aspect is a side member outer panel that forms a portion of an outer surface of the vehicle.

In the fifth aspect, because deformation of the side member outer panel, which forms a portion of the outer surface of a vehicle, is suppressed, a deterioration in the design of the vehicle can be suppressed.

The frame member of a member mounting structure relating to a sixth aspect is made of iron, and the side member outer panel is made of aluminum. Made of iron means not only iron itself, and also includes iron alloys. Made of aluminum means not only aluminum itself, and also includes aluminum alloys.

In the sixth aspect, due to deformation of the side member outer panel being suppressed, the side member panel can be made of aluminum. Therefore, the weight of the vehicle can be lightened.

In a member mounting structure relating to a seventh aspect, the frame member is a vehicle body rear portion member that is made of iron and forms a vehicle cabin and a trunk, and the panel member is a partitioning wall panel that is made of aluminum and partitions the vehicle cabin and the trunk. Made of iron means not only iron itself, and also includes iron alloys. Made of aluminum means not only aluminum itself, and also includes aluminum alloys.

In the seventh aspect, because floating of the partitioning wall member, which is made of aluminum, with respect to the vehicle body rear portion member that is made of iron is suppressed, a deterioration in the sealing between the vehicle body rear portion member and the partitioning wall member can be suppressed.

The present disclosure has the effect of being able to suppress floating of a second member when a first member and the second member are heated, in a structure in which the second member, which has a constraining portion that constrains deformation due to heating and which has a second linear expansion coefficient that is greater than a first linear expansion coefficient, is mounted to the first member that has the first linear expansion coefficient.

BRIEF DESCRIPTION OF THE DRAWINGS

FIG. 3 is an exploded perspective view of a portion of the vehicle body relating to the first embodiment.

FIG. 4 is a partial enlarged view of a hinge pillar portion of a side member outer panel relating to the first embodiment.

FIG. 5 is a cross-sectional view of a portion of the hinge pillar portion of the side member outer panel relating to the first embodiment.

FIG. 6 is an explanatory drawing showing the placement of respective fastened portions and a hinge mounting portion at the hinge pillar portion relating to the first embodiment.

FIG. 10 is an explanatory drawing showing the placement of respective fastened portions and a thick-walled portion at the partitioning wall panel relating to the second embodiment.

FIG. 13 is an explanatory drawing showing the placement of respective fastened portions and a hinge mounting portion at a hinge pillar portion relating to a comparative example.

DETAILED DESCRIPTION

First Embodiment

An example of a member mounting structure relating to a first embodiment is described.

[Overall Structure]

Figure 1:
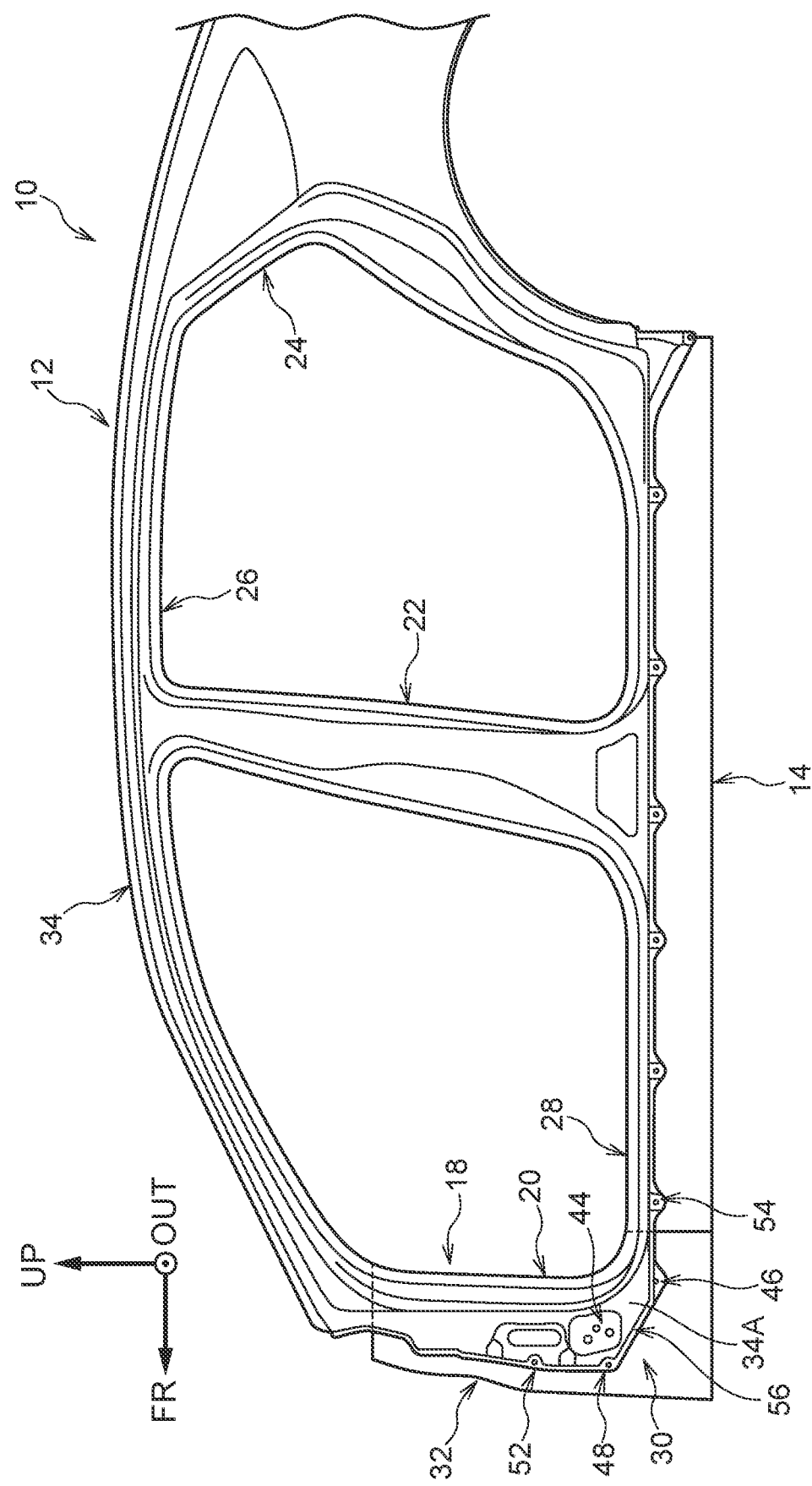
FIG. 1 is a structural drawing showing a portion of a vehicle to which a mounting structure relating to a first embodiment is applied.

A state in which a portion of a vehicle 10 relating to a first embodiment is seen in a side view from a vehicle transverse direction outer side is shown in FIG. 1. Note that arrow FR that is shown appropriately in the respective drawings indicates the vehicle front side (the advancing direction), arrow UP indicates the vehicle upper side, and arrow OUT indicates a vehicle transverse direction outer side. Hereinafter, when description is given by merely using longitudinal, vertical, and left-right directions, they refer to the longitudinal of the vehicle longitudinal direction, the vertical of the vehicle vertical direction, and the left and the right in the vehicle transverse direction when facing in the advancing direction, unless otherwise specified.

The vehicle 10 has a vehicle body 12. The vehicle body 12 is structured to include rockers 14, front pillars 18, center pillars 22, rear pillars 24, roof side rails 26, and mounting structures 30. The mounting structure 30 is an example of the member mounting structure.

Figure 2:
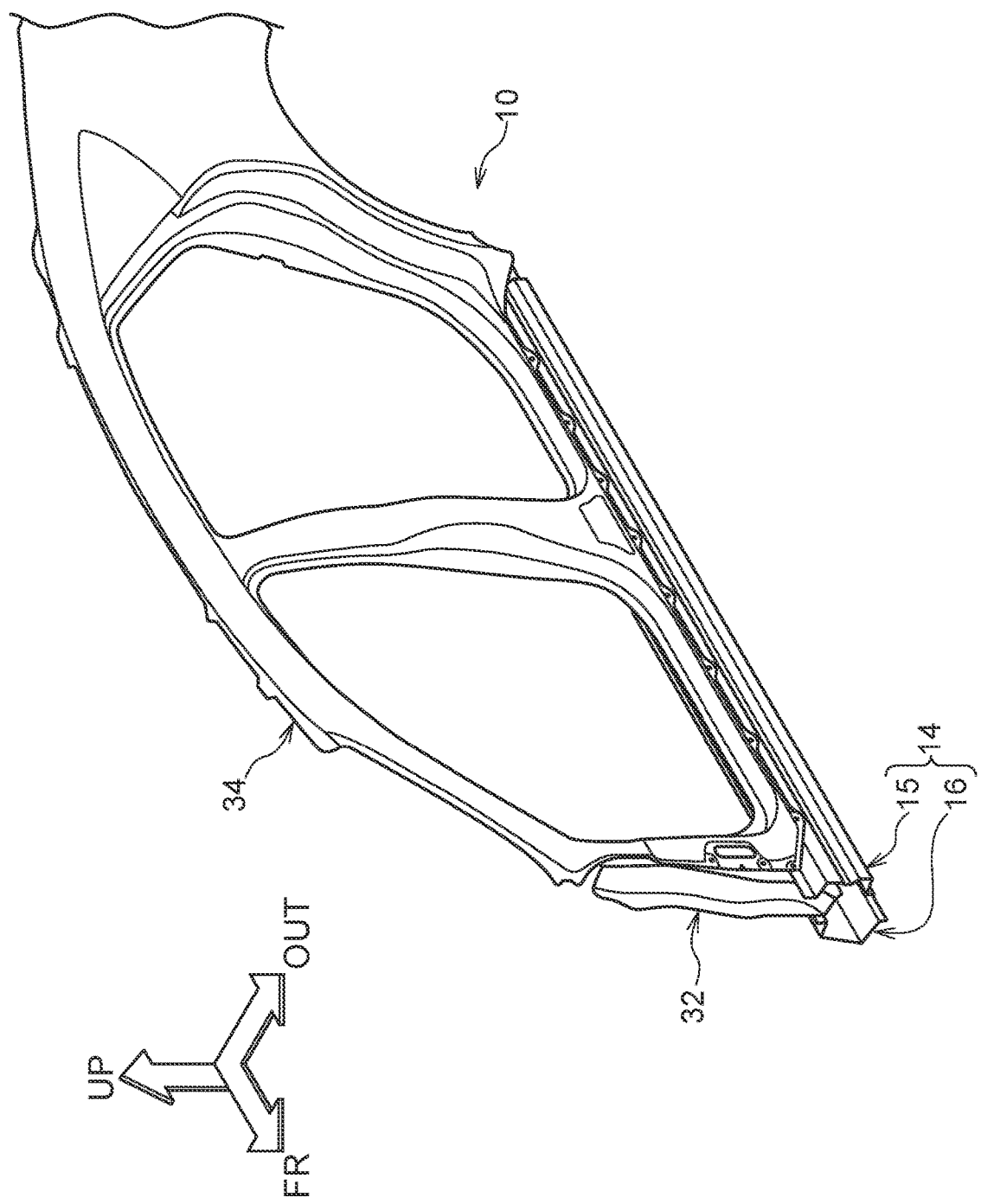
FIG. 2 is a perspective view showing a portion of a vehicle body relating to the first embodiment.

The rocker 14 shown in FIG. 2 is long in the vehicle longitudinal direction, and structures the frame member at the vehicle transverse direction outer end of the vehicle vertical direction lower portion. A frame member is a member that structures the frame of the vehicle 10. Further, when seen from the vehicle longitudinal direction, the rocker 14 is structured due to a rocker outer panel 15, which is shaped as a hat in cross-section and opens toward the vehicle transverse direction inner side, and a rocker inner panel 16, which is shaped as a hat in cross-section and opens toward the vehicle transverse direction outer side, being joined together so as to form a closed cross-section. Weld nuts 17 (see FIG. 5) are formed at the vehicle transverse direction inner side of the rocker outer panel 15. Further, the lower portion of a front pillar lower reinforcement 32 and the lower portion of a side member outer panel 34, which will be described later, are superposed on the rocker outer panel 15 from the vehicle transverse direction outer side, and are fastened by bolts 21 (see FIG. 5).

The front pillar 18 that is shown in FIG. 1 extends toward the vehicle vertical direction upper side with respect to the rocker 14, at the vehicle longitudinal direction front portion of the vehicle body 12. Concretely, the front pillar 18 has an upright portion that stands upright along the vehicle vertical direction from the rocker 14, and an inclined portion that extends in an inclined direction from the upper end of this upright portion to the front end of the roof side rail 26 that is described later. Here, of the front pillar 18, the upright portion (the vehicle vertical direction lower portion) is called a hinge pillar 20.

The hinge pillar 20 that is shown in FIG. 3 is structured to include the front pillar lower reinforcement 32, an unillustrated front pillar inner panel, and a hinge pillar portion 42 of the side member outer panel 34 that is described later. Concretely, at the hinge pillar 20, the front pillar lower reinforcement 32 is superposed, from the vehicle transverse direction outer side, on a front pillar lower retainer 29.

Moreover, the hinge pillar portion 42 of the side member outer panel 34 is superposed, from the vehicle transverse direction outer side, on the front pillar lower reinforcement 32. The front pillar lower reinforcement 32 and the unillustrated front pillar inner panel from a closed cross-section by being joined together in the vehicle transverse direction, and structure a portion of a frame member of the vehicle 10. The mounting structure 30 that is described later is applied to the hinge pillar 20.

The center pillar 22 that is shown in FIG. 1 extends toward the vehicle vertical direction upper side with respect to the rocker 14, at the substantially central portion in the vehicle longitudinal direction at the vehicle body 12. The rear pillar 24 extends toward the vehicle vertical direction upper side with respect to the rocker 14 at the rear portion in the vehicle longitudinal direction at the vehicle body 12. The roof side rail 26 connects the vehicle vertical direction upper portions of the front pillar 18, the center pillar 22 and the rear pillar 24, and extends in the vehicle longitudinal direction. A front door opening portion 28 for ingress/egress of a vehicle occupant is formed by the rocker 14, the front pillar 18, the center pillar 22 and the roof side rail 26. The front door opening portion 28 is opened and closed by an unillustrated front door.

[Structure of Main Portions]

The mounting structure 30 is described next.

The mounting structure 30 shown in FIG. 3 has the front pillar lower reinforcement 32 (hereinafter called front pillar RF 32) that serves as an example of a first member, and the side member outer panel 34 that serves as an example of a second member and a panel member. Note that the mounting structures 30 are structured so as to have left-right symmetry with respect to the vehicle transverse direction of the vehicle 10. Therefore, description is given of the mounting structure 30 at the vehicle left side portion, and description of the mounting structure 30 at the vehicle right side portion is omitted.

<Front Pillar RF>

The front pillar RF 32 is disposed at the vehicle transverse direction outer side with respect to the rocker outer panel 15. The side member outer panel 34 that is described later is disposed at and overlaps the vehicle transverse direction outer side of the front pillar RF 32. The front pillar RF 32, together with the rocker 14, structure a portion of a frame member of the vehicle 10.

Further, the front pillar RF 32 is made of iron as an example and has a linear expansion coefficient K1, which serves as an example of a first linear expansion coefficient, of $K1=12.1\times10^{-6}$/degrees Celsius. Note that, in the present embodiment, the value of the linear expansion coefficient is a value that is measured by the method in accordance with JIS H7404-1993. Moreover, when viewed from the vehicle transverse direction, the front pillar RF 32 is formed in a substantial L-shape. Concretely, the front pillar RF 32 has a lower wall portion 36 that extends in the vehicle longitudinal direction, and a vertical wall portion 38 that extends toward the vehicle vertical direction upper side from the vehicle longitudinal direction front end portion of the lower wall portion 36.

The lower wall portion 36 is superposed on the rocker outer panel 15 from the vehicle transverse direction outer side, and is joined to the rocker outer panel 15. Further, when seen from the vehicle longitudinal direction, the lower wall portion 36 is formed in the shape of a hat in cross-section, which opens toward the vehicle transverse direction inner side. At the lower wall portion 36, the plate-shaped region, whose thickness direction is the vehicle transverse direction and that extends in the vehicle longitudinal direction, is called a base portion 37. An insert-through hole 37A that passes-through in the vehicle transverse direction is formed in the base portion 37. The bolt 21 (see FIG. 5) is inserted-through the insert-through hole 37A.

When seen from the vehicle vertical direction, the vertical wall portion 38 is formed in the shape of a hat in cross-section, which opens toward the vehicle transverse direction inner side. At the vertical wall portion 38, the plate-shaped region, whose thickness direction is the vehicle transverse direction and that extends in the vehicle vertical direction, is called a base portion 39. Insert-through holes 39A, 39B that pass-through in the vehicle transverse direction are formed in the base portion 39. The insert-through hole 39B is disposed at the vehicle vertical direction upper side with respect to the insert-through hole 39A. The bolts 21 (see FIG. 5) are inserted-through the insert-through holes 39A, 39B.

The base portion 37 and the base portion 39 are collectively called a fastened-to portion 35. The hinge pillar portion 42 of the side member outer panel 34 is superposed on the fastened-to portion 35 from the vehicle transverse direction outer side, and is fastened thereto by the bolts 21 (see FIG. 5).

<Side Member Outer Panel>

The side member outer panel 34 that is shown in FIG. 1 is a large member in which regions which structure respective portions of the rocker 14, the front pillar 18, the center pillar 22, the rear pillar 24 and the roof side rail 26, are made integral by press molding. Further, the side member outer panel 34 is a member that forms a portion of the outer surface of the vehicle 10 (structures the outer plate and the design surface of the vehicle 10), and has a surface 34A that is disposed at the vehicle transverse direction outer side. The in-plane direction and the out-of-plane direction in the present embodiment are directions with respect to the surface 34A.

The side member outer panel 34 is made of aluminum as an example, and has a linear expansion coefficient K2, which serves as an example of the second linear expansion coefficient, of $K2=23.0\times10^{-6}$/degrees Celsius. Namely, the side member outer panel 34 has the linear expansion coefficient K2 that is greater than the aforementioned linear expansion coefficient K1 of the front pillar RF 32.

At the side member outer panel 34, the region that structures the vehicle vertical direction lower portion of the front pillar 18 and is superposed on the front pillar RF 32 from the vehicle transverse direction outer side is the hinge pillar portion 42. In other words, the side member outer panel 34 has the hinge pillar portion 42. The hinge pillar portion 42 is fastened (mounted) to the fastened-to portion 35 (see FIG. 3) of the front pillar RF 32.

As shown in FIG. 4, a hinge mounting portion 44, a first fastened portion 46, a second fastened portion 48, a third fastened portion 52, a fourth fastened portion 54 and an unfastened portion 56 are formed at the side member outer panel 34. Further, at the side member outer panel 34, the end portion that is at the outer side with respect to the front door opening portion 28 is called an outer edge portion 62. The outer edge portion 62 has a lower edge portion 62A that is positioned at the lower side with respect to the front door opening portion 28, a front edge portion 62B that is positioned at the front side with respect to the front door opening portion 28, and an inclined edge portion 62C that connects the lower edge portion 62A and the front edge portion 62B.

The lower edge portion 62A is a plate-shaped portion that extends substantially along the vehicle longitudinal direction. The front edge portion 62B is a plate-shaped portion that extends substantially along the vehicle vertical direction. The inclined edge portion 62C connects the front end of the lower edge portion 62A and the lower end of the front edge portion 62B. Further, the inclined edge portion 62C is a plate-shaped portion that extends along an inclined direction such that the front end thereof is positioned further toward the upper side than the rear end thereof.

(Hinge Mounting Portion)

The hinge mounting portion 44 is an example of a constraining portion. The hinge mounting portion 44 is formed at a region, which is between the inclined edge portion 62C and the front door opening portion 28, of the side member outer panel 34. Plural through-holes 45 that pass-through in the vehicle transverse direction are formed in the hinge mounting portion 44. An unillustrated door hinge member is mounted to the hinge mounting portion 44 due to unillustrated bolts being inserted-through the through-holes and fastened together with nuts. This door hinge member supports the unillustrated front door, which opens and closes the front door opening portion 28, such that the front door is able to open and close.

Due to the unillustrated door hinge member being mounted to the hinge mounting portion 44, the rigidity with respect to thermal stress that is applied at the time of heating is increased as compared with at the other regions of the side member outer panel 34. In other words, at the hinge mounting portion 44, deformation of the side member outer panel 34 due to heating (including deformation of the hinge mounting portion 44 itself) is constrained. Constraining deformation means keeping the amount of deformation smaller than the amount of deformation at other regions.

(First Fastened Portion)

The first fastened portion 46 is an example of a first mounted portion, and is a region that is fastened (mounted) to the front pillar RF 32 (see FIG. 3) from the vehicle transverse direction outer side by using the bolt 21 (see FIG. 5). Concretely, the first fastened portion 46 is disposed at the region that is the border between the lower edge portion 62A and the inclined edge portion 62C, and is fastened to the front pillar RF 32. Further, the first fastened portion 46 is structured by an insert-through hole 64, which is circular and passes-through the side member outer panel 34 in the vehicle transverse direction, and a peripheral edge portion 65 that is substantially annular and surrounds the insert-through hole 64. The peripheral edge portion 65 juts-out toward the lower side (the outer side) from the lower edge portion 62A.

(Second Fastened Portion)

The second fastened portion 48 is an example of a second mounted portion, and is a region that is fastened (mounted) to the front pillar RF 32 (see FIG. 3) from the vehicle transverse direction outer side by using the bolt 21 (see FIG. 5). Concretely, the second fastened portion 48 is disposed at the region that is the border between the front edge portion 62B and the inclined edge portion 62C, and is fastened to the front pillar RF 32. Further, the second fastened portion 48 is structured by an insert-through hole 66, which is circular and passes-through the side member outer panel 34 in the vehicle transverse direction, and a peripheral edge portion 67 that is substantially annular and surrounds the insert-through hole 66.

(Third Fastened Portion)

The third fastened portion 52 shown in FIG. 4 is an example of a third mounted portion, and is a region that is fastened (mounted) to the front pillar RF 32 (see FIG. 3) from the vehicle transverse direction outer side by using an unillustrated bolt. Concretely, the third fastened portion 52 is disposed at the front edge portion 62B at the side of the second fastened portion 48 which side is opposite the side at which the unfastened portion 56 is located (i.e., is disposed at the vehicle vertical direction upper side of the second fastened portion 48) so as to be spaced apart therefrom. The third fastened portion 52 is fastened to the front pillar RF 32. Further, the third fastened portion 52 is structured by an insert-through hole 72, which is circular and passes-through the side member outer panel 34 in the vehicle transverse direction, and a peripheral edge portion 73 that is substantially annular and surrounds the insert-through hole 72.

(Fourth Fastened Portion)

The fourth fastened portion 54 is an example of a fourth mounted portion, and is a region that is fastened (mounted) to the front pillar RF 32 (see FIG. 3) from the vehicle transverse direction outer side by using an unillustrated bolt. Concretely, the fourth fastened portion 54 is disposed at the lower edge portion 62A at the side of the first fastened portion 46 which side is opposite the side at which the unfastened portion 56 is located (i.e., is disposed at the vehicle longitudinal direction rear side of the first fastened portion 46) so as to be spaced apart therefrom. The fourth fastened portion 54 is fastened to the front pillar RF 32. Further, the fourth fastened portion 54 is structured by an insert-through hole 68, which is circular and passes-through the side member outer panel 34 in the vehicle transverse direction, and a peripheral edge portion 69 that is substantially annular and surrounds the insert-through hole 68. The peripheral edge portion 69 juts-out toward the lower side (the outer side) from the lower edge portion 62A.

A cross-section of the first fastened portion 46 and the fourth fastened portion 54 is shown in FIG. 5. The first fastened portion 46 and the fourth fastened portion 54 overlap the front pillar RF 32 from the vehicle transverse direction outer side. Further, the region, where the first fastened portion 46 and the fourth fastened portion 54 are lined-up in the vehicle transverse direction, at the front pillar RF 32 overlaps the rocker outer panel 15 from the vehicle transverse direction outer side. Here, due to the bolts 21 being fastened to the weld nuts 17, the first fastened portion 46 and the fourth fastened portion 54 are mounted to the rocker outer panel 15 via the front pillar RF 32. Note that washers 55 in which the shaft portions of the bolts 21 are inserted are provided between the front pillar RF 32 and the first fastened portion 46, and between the front pillar RF 32 and the fourth fastened portion 54. Further, the regions, which are between the side member outer panel 34 and the front pillar RF 32 and at which the washers 55 are not provided, are adhered by an unillustrated adhesive.

(Unfastened Portion)

The unfastened portion 56 is an example of a deformation permitting portion, and is the region provided between the first fastened portion 46 and the second fastened portion 48 at the inclined edge portion 62C. Namely, the unfastened portion 56 is positioned further toward the outer side than the hinge mounting portion 44 at the side member outer panel 34. Moreover, although the unfastened portion 56 contacts the front pillar RF 32 from the vehicle transverse direction outer side, the unfastened portion 56 is not mounted to the front pillar RF 32 (i.e., is an unmounted portion that is not fastened nor joined). Due thereto, the unfastened portion 56 permits deformation of the side member outer panel 34 in the in-plane direction that is directed toward the side (the outer side) that is opposite the hinge mounting portion 44 side, with respect to the first fastened portion 46 and the second fastened portion 48. In other words, the unfastened portion 56 is an example of a releasing portion that releases, toward the side (the outer side) opposite the hinge mounting portion 44 side, thermal stress that is applied in the in-plane direction from the hinge mounting portion 44 side toward between the first fastened portion 46 and the second fastened portion 48, with respect to the first fastened portion 46 and the second fastened portion 48.

As shown in FIG. 6, when the side member outer panel 34 is viewed from the vehicle transverse direction, the central position of the first fastened portion 46 is shown by point A, the central position of the second fastened portion 48 is shown by point B, the central position of the third fastened portion 52 is shown by point C, and the central position of the fourth fastened portion 54 is shown by point D. Segment AD that connects point A and point D runs along the vehicle longitudinal direction. Segment BC that connects point B and point C runs along the vehicle vertical direction.

A region, which includes the contour line of quadrangle ABCD formed by connecting point A, point B, point C, point D, and includes the inner side of the quadrangle ABCD, is called imaginary region S1. Imaginary region S1 is a trapezoidal shape as seen from the vehicle transverse direction. Further, the point of intersection between half-line Ka that is an extension of the segment AD toward the vehicle front side, and half-line Kb that is an extension of the segment BC toward the vehicle lower side, is denoted as point E. A region which includes the contour line of triangle ABE formed by connecting point A, point B, point E, and includes the inner side of triangle ABE, is called outer side region S2.

Here, the position that is the substantial center of the hinge mounting portion 44 is shown by point F. As an example, point F is set at the inner side of the imaginary region S1. In other words, the hinge mounting portion 44 is disposed at the inner side of the imaginary region S1 that is formed by connecting the first fastened portion 46, the second fastened portion 48, the third fastened portion 52 and the fourth fastened portion 54. Other than point A and point B, there is no fastened portion (joined portion) at the outer side region S2.

Comparative Example

A mounting structure 200 of a comparative example is shown in FIG. 13. The mounting structure 200 has a side member outer panel 202 that is made of aluminum (linear expansion coefficient K2), the front pillar RF 32, and the rocker outer panel 15. The side member outer panel 202 has a first fastened portion 204, a second fastened portion 206, a third fastened portion 208, a fourth fastened portion 212 and the hinge mounting portion 44. The structure of the first fastened portion 204, the second fastened portion 206, the third fastened portion 208 and the fourth fastened portion 212 all being fastened by unillustrated bolts and nuts is similar to in the present embodiment.

The first fastened portion 204 is formed at a position (a corner portion of the side member outer panel 202) that corresponds to above-described point E (see FIG. 6). The second fastened portion 206 is formed at a position corresponding to between the above-described point B and point C (see FIG. 6). The third fastened portion 208 is formed further toward the vehicle upper side than point C. The fourth fastened portion 212 is formed at a position corresponding to above-described point D (see FIG. 6). Note that fastened portions are not formed at positions corresponding to above-described point A and point B (see FIG. 6). The hinge mounting portion 44 is formed at a position corresponding to above-described point F.

In the mounting structure 200 of the comparative example, it is assumed that the front pillar RF 32 and the side member outer panel 202 are heated at a high temperature of 100 degrees Celsius or more. In this heated state, the linear expansion coefficient K2 of the side member outer panel 202 is greater than the linear expansion coefficient K1 of the front pillar RF 32. Therefore, the amount of deformation (expansion) due to thermal stress of the side member outer panel 202 is greater than the amount of deformation (expansion) due to thermal stress of the front pillar RF 32. Due thereto, it becomes easy for the side member outer panel 202 to move away from the front pillar RF 32.

Figure 14A:
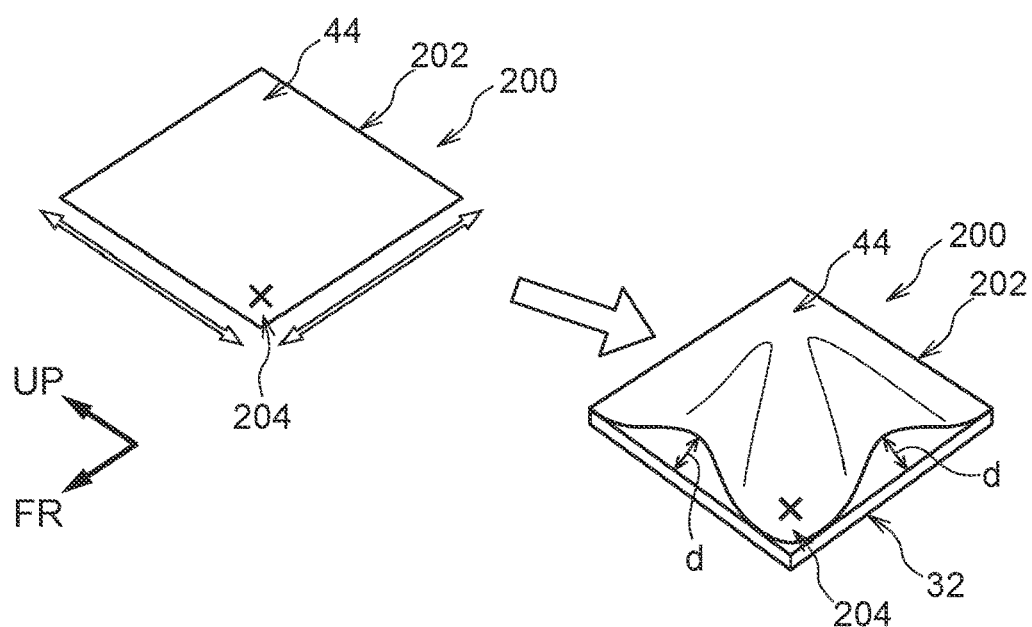
FIG. 14A is an explanatory drawing showing a floating state of a side member outer panel relating to the comparative example.

Here, as shown in FIG. 14A, at the mounting structure 200 of the comparative example, the deformation in the vehicle longitudinal direction (the in-plane direction) and the deformation in the vehicle vertical direction (the in-plane direction) are received at the first fastened portion 204 which is one point. Therefore, at the periphery of the first fastened portion 204, it is difficult for thermal stress to be released (it is difficult to permit deformation in the in-plane direction), and thus, floating amount d (the amount of deformation in the out-of-plane direction) of the side member outer panel 202 with respect to the front pillar RF 32 becomes large.

Figure 14B:
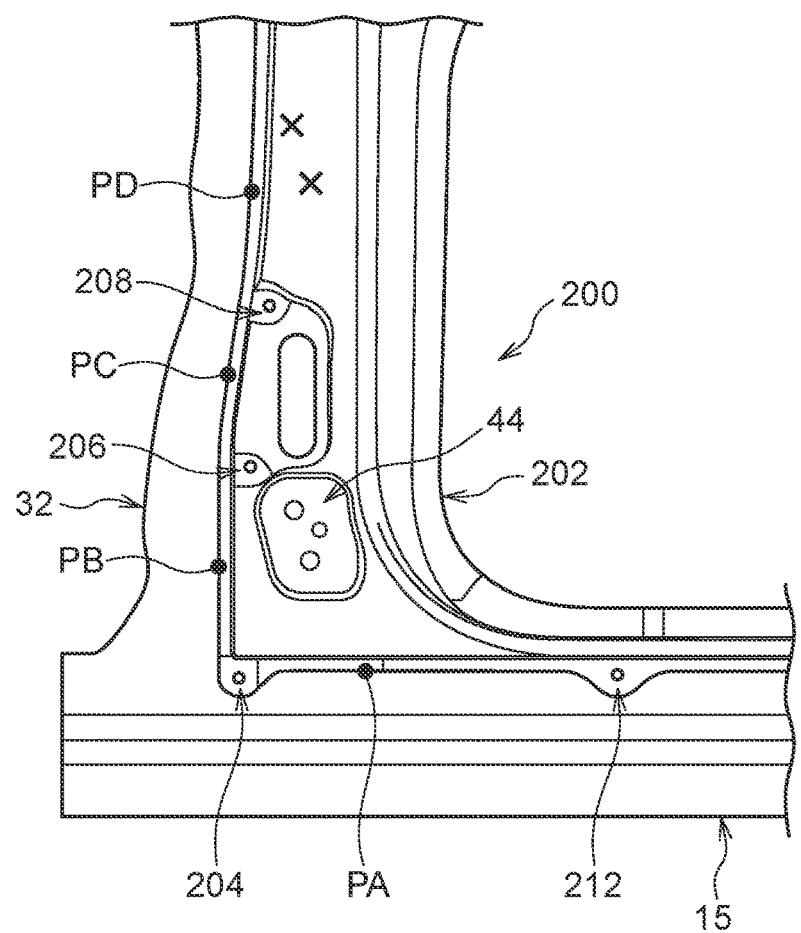
FIG. 14B is an explanatory drawing showing respective fastened places of the side member outer panel relating to the comparative example.

As shown schematically in FIG. 14B, at the mounting structure 200, measurement points PA, PB, PC, PD were set at four places at the side member outer panel 202. Measurement point PA was set between the first fastened portion 204 and the fourth fastened portion 212, measurement point PB was set between the first fastened portion 204 and the second fastened portion 206, measurement point PC was set between the second fastened portion and the third fastened portion 208, and measurement point PD was set further toward the upper side than the third fastened portion 208. Note that the X symbols in FIG. 14B represent the points of fastening.

CAE (Computer Aided Engineering) analysis was carried out on the amount of floating of the side member outer panel 202 with respect to the front pillar RF 32, in a case in which the front pillar RF 32 and the side member outer panel 202 were heated. The heating temperature was set to the temperature of a drying treatment after painting (100 degrees Celsius or more). The results of this CAE analysis were that, in the mounting structure 200 of the comparative example, the floating amount at measurement point PA was 1.83, the floating amount at measurement point PB was 1.75, the floating amount at measurement point PC was 1.02, and the floating amount at measurement point PD was 0.92. Note that the unit of the floating amount is mm.

[Operation and Effects]

Operation and effects of the mounting structure 30 of the present embodiment are described next.

It is assumed that the front pillar RF 32 and the side member outer panel 34 that are shown in FIG. 1 are heated at a high temperature of 100 degrees Celsius or more. In this heated state, the linear expansion coefficient K2 of the side member outer panel 34 is greater than the linear expansion coefficient K1 of the front pillar RF 32. Therefore, the amount of deformation (expansion) due to thermal stress of the side member outer panel 34 is greater than the amount of deformation (expansion) due to thermal stress of the front pillar RF 32. At the side member outer panel 34, although deformation due to thermal stress is constrained at the hinge mounting portion 44, the thermal stress is applied toward the respective fastened regions, and therefore, the deformation amount is large. In particular, the hinge mounting portion 44 that is shown in FIG. 6 is disposed at the inner side of the imaginary region S1 formed by the first fastened portion 46, the second fastened portion 48, the third fastened portion 52 and the fourth fastened portion 54, and thus, it is easy for thermal stress to be applied to the respective fastened portions as compared with a structure in which the hinge mounting portion 44 is disposed at the outer side thereof. Due thereto, it is easy for the side member outer panel 34 to float with respect to (move away from) the front pillar RF 32.

Here, in the mounting structure 30 that is shown in FIG. 4, the mounted regions, which are at the side member outer panel 34 and which are regions to which thermal stress is applied from the hinge mounting portion 44 side, are, at the outer edge portion 62, at least the two places that are the first fastened portion 46 and the second fastened portion 48. Therefore, as compared with a structure in which the fastened region is at one place as in the comparative example, thermal stress in the in-plane direction that is applied to the fastening (the mounted regions) is dispersed. Moreover, the unfastened portion 56 is not mounted to the front pillar RF 32 (see FIG. 3). Namely, the unfastened portion 56 permits deformation in the in-plane direction of the region between the first fastened portion 46 and the second fastened portion 48. In other words, the unfastened portion 56 releases, toward the side opposite the hinge mounting portion 44 side, the thermal stress in the in-plane direction that is applied between the first fastened portion 46 and the second fastened portion 48. Therefore, the amount of deformation in the out-of-plane direction of the side member outer panel 34 is small at the peripheral portion of the first fastened portion 46, the peripheral portion of the second fastened portion 48, and at the region between the first fastened portion 46 and the second fastened portion 48.

Figure 7A:
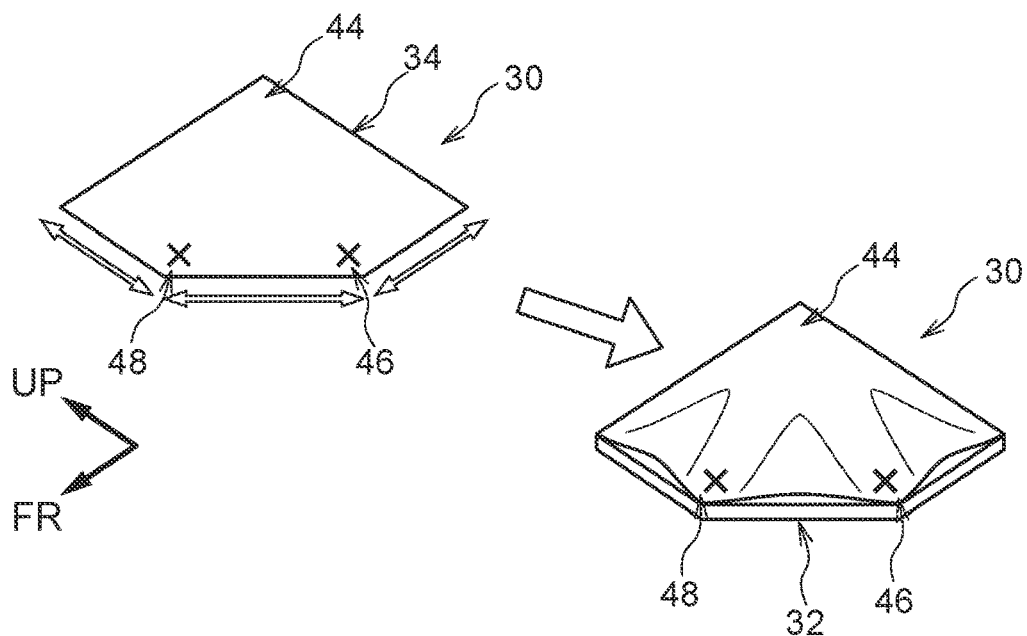
FIG. 7A is an explanatory drawing showing a floating state of the side member outer panel relating to the first embodiment.

In other words, as shown in FIG. 7A, at the mounting structure 30, the region between the first fastened portion 46 and the second fastened portion 48 can elongate freely in the in-plane direction in which thermal stress is applied. Moreover, due to the unfastened portion 56 having an outer shape that extends in an inclined direction with respect to the vehicle longitudinal direction and the vehicle vertical direction, the angle of the deformation that each of the first fastened portion 46 and the second fastened portion 48 is allotted is slight as compared with in the comparative example. For these reasons, the amount of deformation of the side member outer panel 34 (the amount of deformation in the out-of-plane direction that intersects the in-plane direction in which thermal stress is applied) is small at the peripheral portion of the first fastened portion 46, the peripheral portion of the second fastened portion 48, and the region between the first fastened portion 46 and the second fastened portion 48, respectively. Due thereto, floating of the side member outer panel 34 when the front pillar RF 32 (see FIG. 3) and the side member outer panel 34 are heated can be suppressed as compared with the above-described comparative example.

Further, at the mounting structure 30, the third fastened portion 52 is adjacent to the second fastened portion 48 along the outer edge portion 62, and the fourth fastened portion 54 is adjacent to the first fastened portion 46 along the outer edge portion 62. Namely, because the respective fastened portions are disposed at the outer edge portion 62 where floating-up is easy as compared with at the inner side, floating of the side member outer panel 34 can be suppressed further.

Moreover, at the mounting structure 30, because the unfastened portion 56 is formed at the side member outer panel 34, deformation of the side member outer panel 34, which deforms easily at the time of drying after painting, can be suppressed.

In addition, at the mounting structure 30, because deformation of the side member outer panel 34 that forms a portion of the outer surface of the vehicle 10 is suppressed, a deterioration in the design of the vehicle 10 can be suppressed.

Further, at the mounting structure 30, due to deformation of the side member outer panel 34 being suppressed, the side member outer panel 34 can be formed of aluminum. Therefore, the vehicle 10 can be made to be lighter-weight as compared with a structure in which the side member outer panel 34 is made of iron.

(Measurement of Floating Amount)

Figure 7B:
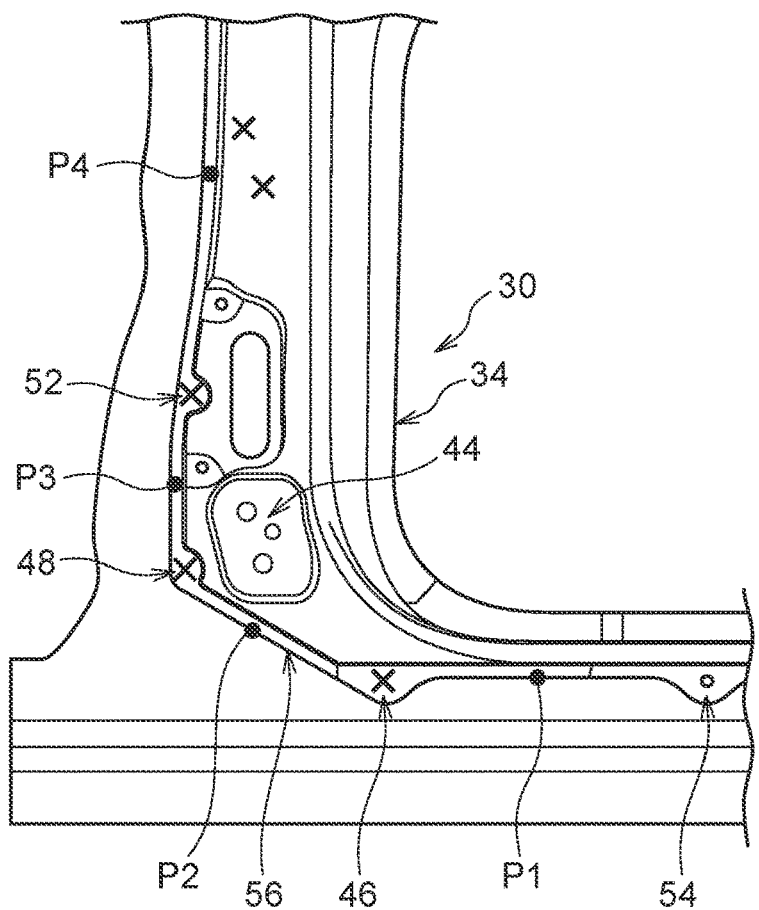
FIG. 7B is an explanatory drawing showing respective fastened places of the side member outer panel relating to the first embodiment.

As shown schematically in FIG. 7B, the measurement points P1, P2, P3, P4 were set at four places at the side member outer panel 34. Measurement point P1 was set between the first fastened portion 46 and the third fastened portion 52, measurement point P2 was set between the first fastened portion 46 and the second fastened portion 48, measurement point P3 was set between the second fastened portion 48 and the fourth fastened portion 54, and measurement point P4 was set further toward the upper side than the fourth fastened portion 54. Note that symbol X in FIG. 7B shows the fastened points.

The amount of floating of the side member outer panel 34 with respect to the front pillar RF 32 in a case in which the front pillar RF 32 (see FIG. 3) and the side member outer panel 34 were heated, was carried out by the above-described CAE. The heating temperature was set to be a temperature (100 degrees Celsius or more) of drying processing after painting. As a result of this CAE analysis, it was confirmed that, at the mounting structure 30, the amount of floating at measurement point P1 was 0.75, the amount of floating at measurement point P2 was 1.17, the amount of floating at measurement point P3 was 0.66, and the amount of floating at measurement point P4 was 0.60, and the floating amounts were small as compared with the comparative example. Note that the unit of the amount of floating is mm.

Second Embodiment

A mounting structure 80, which serves as an example of a member mounting structure relating to a second embodiment, is described next. Note that members and regions that are basically the same as those of the above-described first embodiment are denoted by the same reference numerals as in the above-described first embodiment, and description thereof is omitted.

Figure 8:
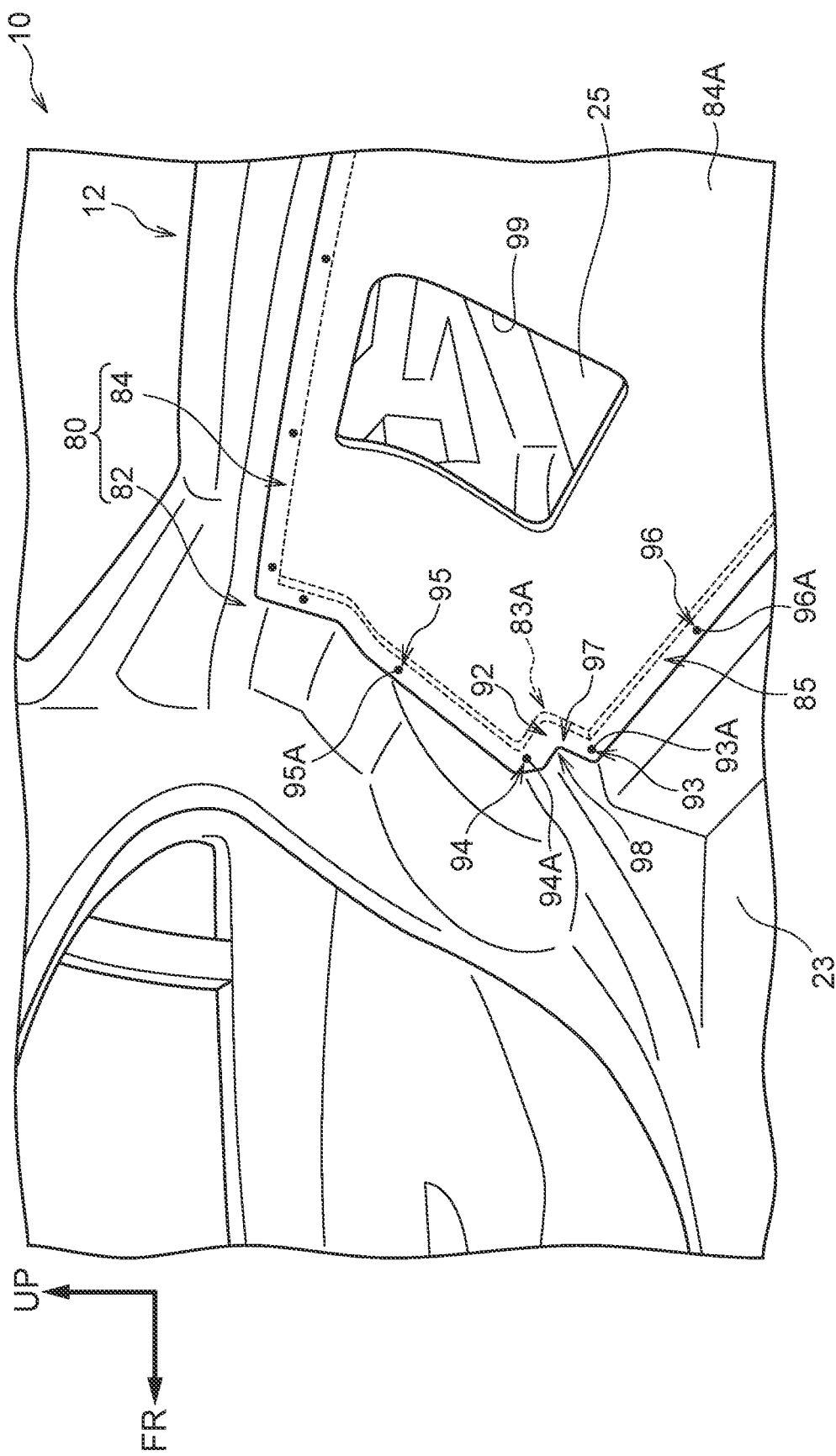
FIG. 8 is an explanatory drawing showing a state in which a vehicle cabin and a trunk relating to a second embodiment are partitioned by a partitioning wall panel.

The mounting structure 80 of the second embodiment that is shown in FIG. 8 has a vehicle body rear portion member 82 that serves as a first member, and a partitioning wall panel 84 that serves as a second member.

<Vehicle Body Rear Portion Member>

Figure 9:
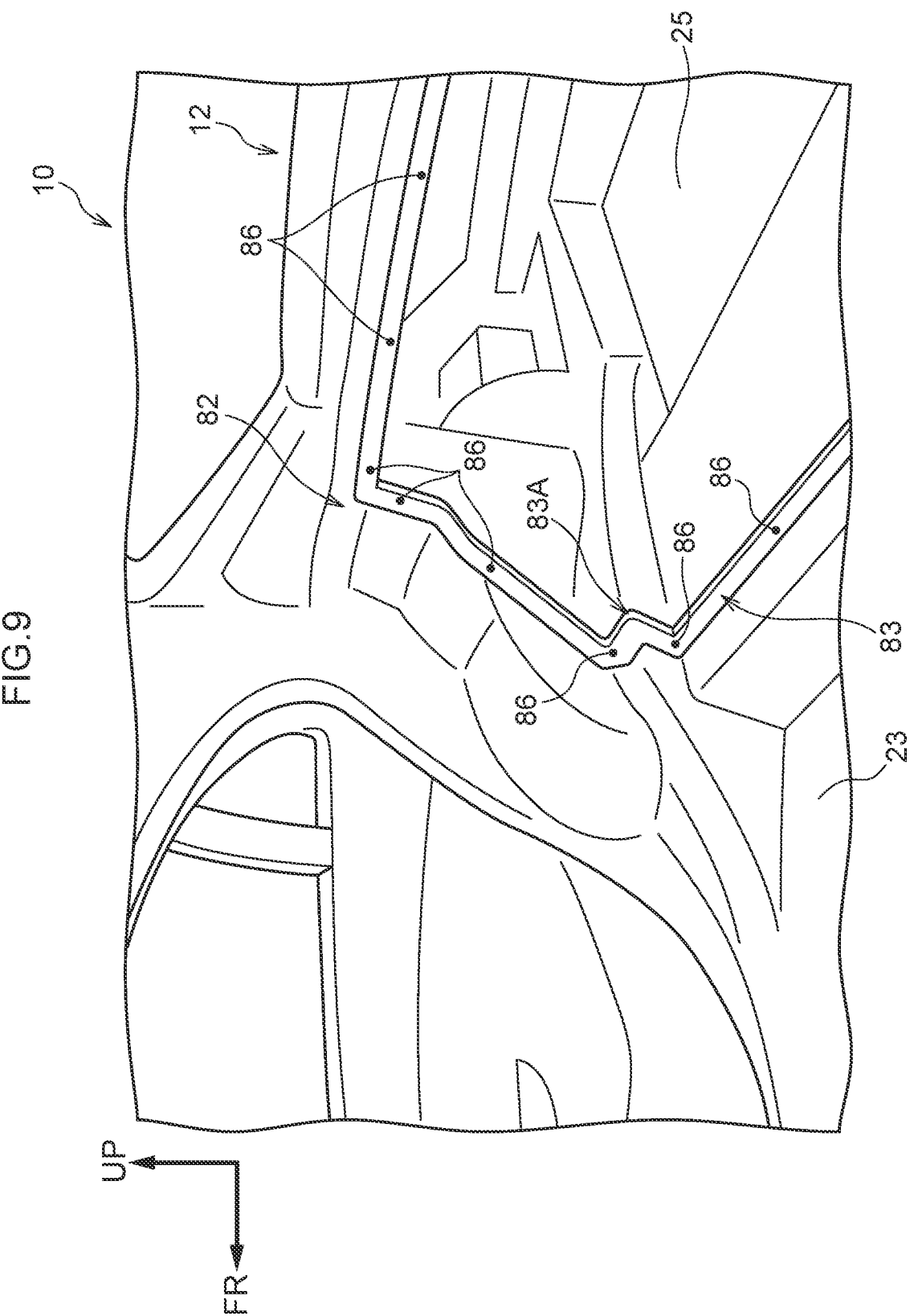
FIG. 9 is an explanatory drawing showing the vehicle cabin and the trunk relating to the second embodiment.

The vehicle body rear portion member 82 that is shown in FIG. 9 is a member that structures a portion of the vehicle body 12, and is a member that structures a portion that is further toward the rear side than the vehicle longitudinal direction center of the vehicle 10. Further, as an example, the vehicle body rear portion member 82 is made of iron, and has the above-described linear expansion coefficient K1. The vehicle body rear portion member 82 forms a vehicle cabin 23 and a trunk 25 of the vehicle 10. The vehicle cabin 23 is a space portion in which are disposed unillustrated seats in which vehicle occupants sit. The trunk 25 is a space portion in which objects are accommodated. Moreover, a fastened-to portion 83 that serves as example of a joined-to portion is formed at the vehicle body rear portion member 82.

The fastened-to portion 83 is formed in an annular shape (a frame shape), as seen from the vehicle longitudinal direction, at a region that is the border between the vehicle cabin 23 and the trunk 25 at the vehicle body rear portion member 82. Further, plural through-holes 86 are formed with intervals therebetween in the peripheral direction at the fastened-to portion 83. Unillustrated weld nuts are provided at the trunk 25 side at the edge portions of the plural through-holes 86. Unillustrated bolts are fastened together with these weld nuts.

Corner portions 83A, which are positioned at the vehicle transverse direction both ends and the vehicle vertical direction lower ends of the fastened-to portion 83, are, as an example, recessed in L-shapes toward the inner side as seen from the vehicle longitudinal direction. Two of the through-holes 86 are formed at the both ends of this region that is recessed-in in an L-shape. The other through-holes 86 are formed in the fastened-to portion 83 at intervals, in the vehicle transverse direction and the vehicle vertical direction, with respect to these through-holes 86 that are at the two places.

<Partitioning Wall Panel 84>

The partitioning wall panel 84 that is shown in FIG. 8 is, as an example, made of an aluminum, and has the above-described linear expansion coefficient K2. Further, as seen from the vehicle longitudinal direction, the partitioning wall panel 84 is formed in the shape of a plate that is substantially rectangular and whose short-side direction is in the vehicle vertical direction and whose length direction is in the vehicle transverse direction. A thick-walled portion 92, a first fastened portion 93, a second fastened portion 94, a third fastened portion 95, a fourth fastened portion 96, and an unfastened portion 97 are formed in an outer edge portion 85, which is the peripheral edge of the partitioning wall panel 84, in correspondence with the positions of the plural through-holes 86 (see FIGS. 7A and 7B) for example. Moreover, the partitioning wall panel 84 has a surface 84A that is disposed at the vehicle longitudinal direction front side thereof. Note that the in-plane direction and the out-of-plane direction in the present embodiment are directions with respect to the surface 84A of the partitioning wall panel 84.

The first fastened portion 93, the second fastened portion 94, the third fastened portion 95 and the fourth fastened portion 96 are fastened (joined) to the fastened-to portion 83 (see FIGS. 7A and 7B) by using unillustrated bolts. An opening portion 99 that passes-through in the plate-thickness direction (the vehicle longitudinal direction) is formed in the central portion of the partitioning wall panel 84. Note that the partitioning wall panel 84 is structured so as to have left-right symmetry with respect to the vehicle transverse direction center. Therefore, hereinafter, the mounting structure 80 at the vehicle right side is described, and description of the mounting structure 80 at the vehicle left side is omitted.

(Thick-Walled Portion)

A thick-walled portion 92 is a region whose wall thickness is made to be thicker than that of the other regions of the partitioning wall panel 84, and is an example of the constraining portion. The thick-walled portion 92 is formed at a position that overlaps, in the vehicle longitudinal direction, the apex of the corner portion 83A (see FIGS. 7A and 7B) of the fastened-to portion 83. The rigidity, with respect to thermal stress that is applied at the time of heating, at the thick-walled portion 92 is high as compared with at other regions at the partitioning wall panel 84. In other words, at the thick-walled portion 92, deformation of the partitioning wall panel 84 due to heat (including deformation of the thick-walled portion 92 itself) is constrained.

(First Fastened Portion)

The first fastened portion 93 is an example of the first mounted portion, and is mounted to the vehicle body rear portion member 82. The first fastened portion 93 is disposed at the vehicle vertical direction lower side (the lower end) with respect to the corner portion 83A of the vehicle body rear portion member 82. Moreover, the first fastened portion 93 is structured by a through-hole 93A that passes-through the partitioning wall panel 84 in the vehicle longitudinal direction, and the peripheral edge portion of the through-hole 93A.

(Second Fastened Portion)

The second fastened portion 94 is an example of the second mounted portion, and is mounted to the vehicle body rear portion member 82. The second fastened portion 94 is disposed at the vehicle transverse direction outer side (the outer end) with respect to the corner portion 83A of the vehicle body rear portion member 82. Moreover, the second fastened portion 94 is structured by a through-hole 94A that passes-through the partitioning wall panel 84 in the vehicle longitudinal direction, and the peripheral edge portion of the through-hole 94A.

(Third Fastened Portion)

The third fastened portion 95 is an example of the third mounted portion, and is mounted to the vehicle body rear portion member 82. The third fastened portion 95 is disposed at the vehicle vertical direction upper side with respect to the second fastened portion 94. Moreover, the third fastened portion 95 is structured by a through-hole 95A that passes-through the partitioning wall panel 84 in the vehicle longitudinal direction, and the peripheral edge portion of the through-hole 95A.

(Fourth Fastened Portion)

The fourth fastened portion 96 is an example of the fourth mounted portion, and is mounted to the vehicle body rear portion member 82. The fourth fastened portion 96 is disposed at the vehicle transverse direction inner side with respect to the first fastened portion 93. Moreover, the fourth fastened portion 96 is structured by a through-hole 96A that passes-through the partitioning wall panel 84 in the vehicle longitudinal direction, and the peripheral edge portion of the through-hole 96A.

(Unfastened Portion)

The unfastened portion 97 is an example of the deformation permitting portion, and is the region, which is between the first fastened portion 93 and the second fastened portion 94, at the outer edge portion 85. Further, the unfastened portion 97 is positioned further toward the outer side than the thick-walled portion 92. Moreover, the unfastened portion 97 contacts the fastened-to portion 83 from the vehicle longitudinal direction front side, but is not mounted to the fastened-to portion 83 (i.e., is an unmounted portion that is not fastened nor joined). Due thereto, the unfastened portion 97 permits deformation of the partitioning wall panel 84, in the in-plane direction that is directed toward the side (the outer side) opposite the thick-walled portion 92 side, with respect to the first fastened portion 93 and the second fastened portion 94. In other words, the unfastened portion 97 is an example of a releasing portion that releases, toward the side (the outer side) opposite the thick-walled portion 92 side, the thermal stress applied in the in-plane direction from the thick-walled portion 92 side toward the region between the first fastened portion 93 and the second fastened portion 94, with respect to the first fastened portion 93 and the second fastened portion 94.

Further, a recessed portion 98 is formed at the unfastened portion 97. As seen from the vehicle longitudinal direction, the recessed portion 98 is a region that is recessed in a V-shape toward the thick-walled portion 92. In other words, the recessed portion 98 is a region at which the partitioning wall panel 84 is cut-out in a substantially triangular shape.

Here, due to the outer edge portion 85 of the partitioning wall panel 84 being superposed on the fastened-to portion 83 (see FIGS. 7A and 7B) from the vehicle longitudinal direction front side and being fastened by unillustrated bolts, the partitioning wall panel 84 is fixed to the vehicle body rear portion member 82. The partitioning wall panel 84 that is fixed to the vehicle body rear portion member 82 partitions the vehicle cabin 23 and the trunk 25.

As shown in FIG. 10, when the partitioning wall panel 84 is seen from the vehicle longitudinal direction, the central position of the first fastened portion 93 is shown by point A, the central position of the second fastened portion 94 is shown by point B, the central position of the third fastened portion 95 is shown by point C, and the central position of the fourth fastened portion 96 is shown by point D. Segment AD that connects point A and point D runs substantially along the vehicle transverse direction. Segment BC that connects point B and point C runs substantially along the vehicle vertical direction.

The region which includes the contour line of quadrangle ABCD formed by connecting point A, point B, point C, point D, and includes the inner side of the quadrangle ABCD, is called imaginary region S3. Imaginary region S3 is a trapezoidal shape as seen from the vehicle longitudinal direction. Further, the point of intersection between half-line Kc that is an extension of the segment AD toward the vehicle left side, and half-line Kd that is an extension of the segment BC toward the vehicle lower side, is denoted as point E. The region which includes the contour line of triangle ABE formed by connecting point A, point B, point E, and includes the inner side of triangle ABE, is called outer side region S4.

Here, the position that is the substantial center of the thick-walled portion 92 is shown by point F. As an example, point F is set at the inner side of the imaginary region S3. In other words, the thick-walled portion 92 is disposed at the inner side of the imaginary region S3 that is formed by the first fastened portion 93, the second fastened portion 94, the third fastened portion 95 and the fourth fastened portion 96 being connected. Other than point A and point B, there is no fastened portion (joined portion) at the outer side region S4.

Further, the position that corresponds to the bottom apex of the recessed portion 98 is shown by point G. Point G is positioned at the point F side with respect to an imaginary line KL that connects point A and point B. In other words, point G is disposed at the inner side of the region of the triangle ABF. At the partitioning wall panel 84, at the inner side of the region of quadrangle AEBF, there is no region where the partitioning wall panel 84 is mounted to the vehicle body rear portion member 82.

[Operation and Effects]

Operation and effects of the mounting structure 80 of the second embodiment are described next.

It is assumed that the vehicle body rear portion member 82 and the partitioning wall panel 84 that are shown in FIG. 8 are heated at a high temperature of 100 degrees Celsius or more. In this heated state, the linear expansion coefficient K2 of the partitioning wall panel 84 is greater than the linear expansion coefficient K1 of the vehicle body rear portion member 82. Therefore, the amount of deformation (expansion) of the partitioning wall panel 84 due to thermal stress is greater than the amount of deformation (expansion) of the vehicle body rear portion member 82 due to thermal stress. At the partitioning wall panel 84, although deformation due to thermal stress is constrained at the thick-walled portion 92, thermal stress is applied toward the respective fastened regions, and therefore, the amount of deformation is large. In particular, because the thick-walled portion 92 is disposed at the inner side of the imaginary region S3 that is formed by the first fastened portion 93, the second fastened portion 94, the third fastened portion 95 and the fourth fastened portion 96, it is easy for thermal stress to be applied to the respective fastened portions, as compared with a structure in which the thick-walled portion 92 is disposed at the outer side. Due thereto, it is easy for the partitioning wall panel 84 to float with respect to (move away from) the vehicle body rear portion member 82.

Here, in the mounting structure 80 that is shown in FIG. 10, the mounted regions, which are at the partitioning wall panel 84 and which are regions to which thermal stress is applied from the thick-walled portion 92 side, are, at the outer edge portion 85, at least the two places that are the first fastened portion 93 and the second fastened portion 94. Therefore, as compared with a structure in which a fastened region is at one place as in the above-described comparative example, thermal stress in the in-plane direction that is applied to the fastening (the mounted regions) is dispersed. Moreover, the unfastened portion 97 is not mounted to the vehicle body rear portion member 82 (see FIG. 9). Due thereto, the unfastened portion 97 permits deformation in the in-plane direction of the region between the first fastened portion 93 and the second fastened portion 94. In other words, the unfastened portion 97 releases, toward the side opposite the thick-walled portion 92 side, the thermal stress in the in-plane direction that is applied from the thick-walled portion 92 side toward between the first fastened portion 93 and the second fastened portion 94. Therefore, at the mounting structure 80, the region between the first fastened portion 93 and the second fastened portion 94 can elongate freely in the in-plane direction in which the thermal stress is applied.

In this way, at the mounting structure 80, the amount of deformation of the partitioning wall panel 84 (the amount of deformation in the out-of-plane direction that intersects the in-plane direction in which thermal stress is applied) is small respectively at the peripheral portion of the first fastened portion 93, the peripheral portion of the second fastened portion 94, and the region between the first fastened portion 93 and the second fastened portion 94. Due thereto, floating of the partitioning wall panel 84 in a case in which the vehicle body rear portion member 82 and the partitioning wall panel 84 are heated can be suppressed as compared with the comparative example.

Further, in the mounting structure 80, the third fastened portion 95 is adjacent to the second fastened portion 94 along the outer edge portion 85, and the fourth fastened portion 96 is adjacent to the first fastened portion 93 along the outer edge portion 85. Namely, because the respective fastened portions are disposed at the outer edge portion 85 that floats easily as compared with the region at the inner side, floating of the partitioning wall panel 84 can be suppressed more.

Further, in the mounting structure 80, floating of the partitioning wall panel 84, which is made of aluminum, with respect to the vehicle body rear portion member 82 that is made of iron is suppressed. Therefore, a deterioration in the sealing between the vehicle body rear portion member 82 and the partitioning wall panel 84 can be suppressed.

MODIFIED EXAMPLES

Note that the present disclosure is not limited to the above-described embodiments.

First Modified Example

Figure 11A:
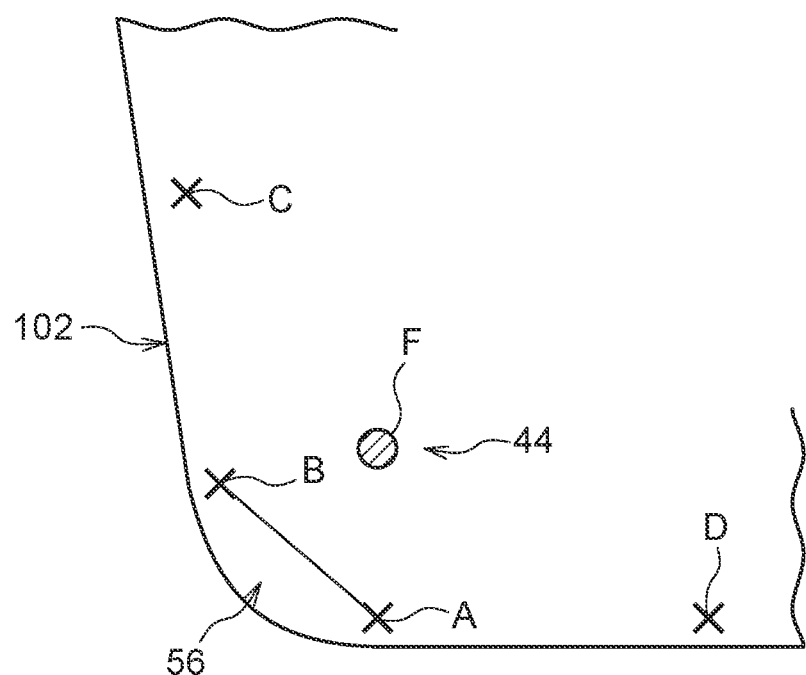
FIG. 11A is an explanatory drawing of a side member outer panel relating to a first modified example.

Instead of the side member outer panel 34 that is shown in FIG. 6, a side member outer panel 102, which is shown in FIG. 11A and serves as an example of a second member and a panel member, may be used. At the side member outer panel 102, the unfastened portion 56 is formed in the shape of an arc that is convex toward the outer side (the side opposite the point F side with respect to segment AB), with respect to point A and point B at the side member outer panel 34 (see FIG. 6).

Second Modified Example

Figure 11B:
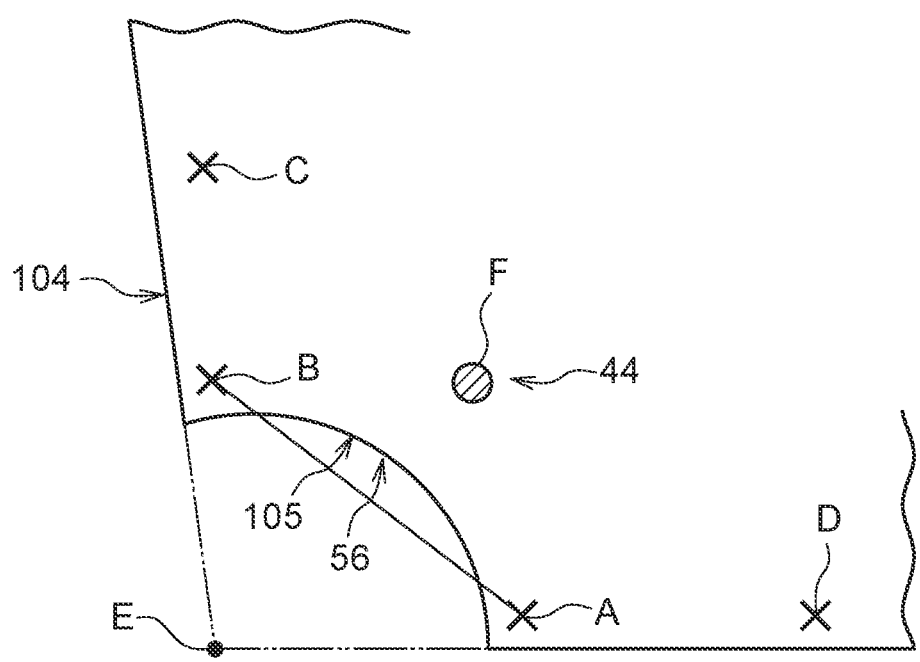
FIG. 11B is an explanatory drawing of a side member outer panel relating to a second modified example.

Instead of the side member outer panel 34 that is shown in FIG. 6, a side member outer panel 104, which is shown in FIG. 11B and serves as an example of a second member and a panel member, may be used. At the side member outer panel 104, the unfastened portion 56 is formed in the shape of an arc that is convex toward the inner side (the point F side with respect to segment AB), with respect to point A and point B at the side member outer panel 34 (see FIG. 6). In other words, a recessed portion 105 that is arc-shaped may be formed at the unfastened portion 56. Note that intersection point E may be set along the contour line of the side member outer panel 104.

Third Modified Example

Figure 12:
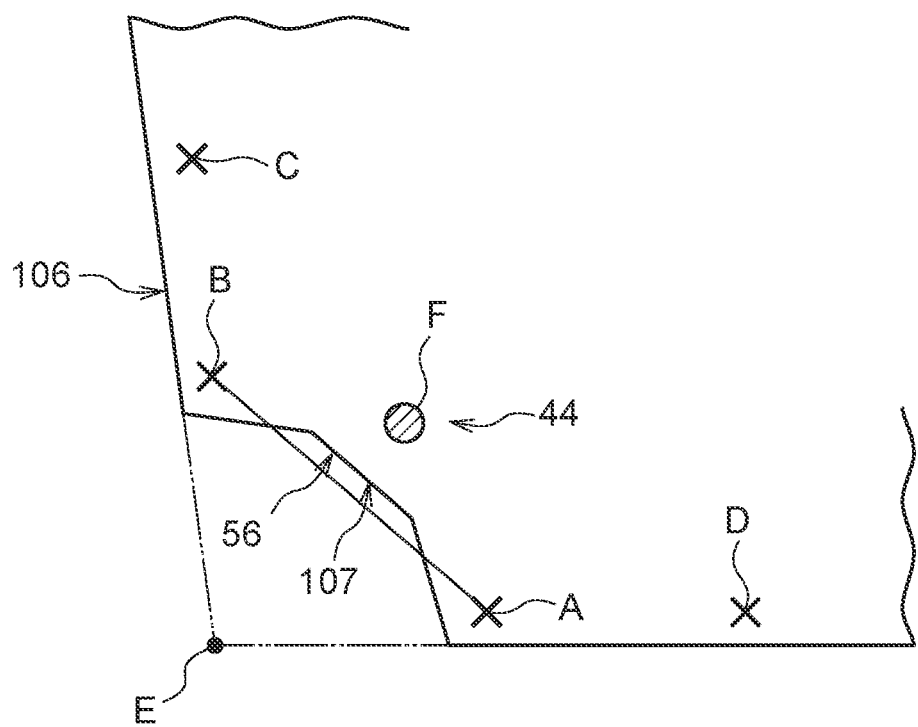
FIG. 12 is an explanatory drawing of a side member outer panel relating to a third modified example.

Instead of the side member outer panel 34 that is shown in FIG. 6, a side member outer panel 106, which is shown in FIG. 12 and serves as an example of a second member and a panel member, may be used. At the side member outer panel 106, the unfastened portion 56 is formed in the shape of a trapezoid that is convex toward the inner side (the point F side with respect to segment AB), with respect to point A and point B at the side member outer panel 34 (see FIG. 6). In other words, a recessed portion 107 that is trapezoidal may be formed at the unfastened portion 56. Note that intersection point E may be set along the contour line of the side member outer panel 106.

Other Modified Examples

In the mounting structure 30, the recessed portion 98 may be formed at the unfastened portion 56. Further, in the mounting structure 30, the hinge mounting portion 44 may be disposed at the outer side of the imaginary region S1.

The mounted portion is not limited to a region that is mounted by fastening such as by respective fastened portions, and may be a region that is mounted by joining such as welding or the like. The mounted portion may be a region that is mounted by joining using SPRs (self piercing rivets) or FDSs (flow drill screws).

The first member is not limited to the front pillar RF 32, and may be another inner panel that is disposed at the vehicle transverse direction inner side with respect to the side member outer panel 34. Further, in the present disclosure, provided that two members that have different linear expansion coefficients are constrained at plural places and heat is applied thereto, effects that are similar to those of the present disclosure can be obtained. The first member and the second member are not limited to members for vehicles, and the present disclosure may be used at, for example, a metal plate on an electronic substrate (a structure having a resin layer and a metal layer), or the like.

The combination of materials having different linear expansion coefficients is not limited to iron and aluminum, and may be a combination of iron and an aluminum alloy or other metals, or may be a combination of a metal and resin.

The constraining portion is not limited to a region at which it is easy for deformation to be constrained by the mounting of another member such as the hinge mounting portion 44, nor to a region at which it is easy for deformation to be constrained by making the plate thickness thicker such as the thick-walled portion 92. For example, the constraining portion may be a region that forms a ridgeline and whose rigidity with respect to thermal stress is increased.

Although examples of vehicle side portion structures relating to embodiments and modified examples of the present disclosure have been described above, these embodiments and modified examples may be used by being combined together appropriately, and the present disclosure can, of course, be implemented in various forms within a scope that does not depart from the gist thereof.

What is claimed is:

1. A member mounting structure comprising:
a first member that has a first linear expansion coefficient; and
a second member that has a second linear expansion coefficient that is greater than the first linear expansion coefficient, and at which, among a first mounted portion, a second mounted portion, a third mounted portion and a fourth mounted portion that are mounted to the first member and are disposed at four vertices that form a quadrangular imaginary region when a surface of the second member is seen from an out-of-plane direction, at least the first mounted portion and the second mounted portion are disposed at an outer edge portion of the second member, and the second member has a constraining portion, which is disposed at an inner side of the imaginary region and constrains deformation that is due to heating, and a deformation permitting portion that is provided between the first mounted portion and the second mounted portion and that permits deformation, in an in-plane direction, of a region between the first mounted portion and the second mounted portion.

2. The member mounting structure of claim 1, wherein the third mounted portion is adjacent to the second mounted portion along the outer edge portion, and the fourth mounted portion is adjacent to the first mounted portion along the outer edge portion.

3. The member mounting structure of claim 1, wherein a recessed portion, which is recessed toward an inner side in the in-plane direction, is formed at the deformation permitting portion.

4. The member mounting structure of claim 2, wherein a recessed portion, which is recessed toward an inner side in the in-plane direction, is formed at the deformation permitting portion.

5. The member mounting structure of claim 1, wherein the first member is a frame member of a vehicle, and the second member is a panel member that is mounted to the frame member.

6. The member mounting structure of claim 2, wherein the first member is a frame member of a vehicle, and the second member is a panel member that is mounted to the frame member.

7. The member mounting structure of claim 3, wherein the first member is a frame member of a vehicle, and the second member is a panel member that is mounted to the frame member.

8. The member mounting structure of claim 5, wherein the panel member is a side member outer panel that forms a portion of an outer surface of the vehicle.

9. The member mounting structure of claim 6, wherein the panel member is a side member outer panel that forms a portion of an outer surface of the vehicle.

10. The member mounting structure of claim 7, wherein the panel member is a side member outer panel that forms a portion of an outer surface of the vehicle.

11. The member mounting structure of claim 8, wherein the frame member is made of iron, and
the side member outer panel is made of aluminum.

12. The member mounting structure of claim 9, wherein the frame member is made of iron, and
the side member outer panel is made of aluminum.

13. The member mounting structure of claim 10, wherein the frame member is made of iron, and
the side member outer panel is made of aluminum.

14. The member mounting structure of claim 5, wherein the frame member is a vehicle body rear portion member that is made of iron and forms a vehicle cabin and a trunk, and
the panel member is a partitioning wall panel that is made of aluminum and partitions the vehicle cabin and the trunk.

15. The member mounting structure of claim 6, wherein the frame member is a vehicle body rear portion member that is made of iron and forms a vehicle cabin and a trunk, and
the panel member is a partitioning wall panel that is made of aluminum and partitions the vehicle cabin and the trunk.

16. The member mounting structure of claim 7, wherein the frame member is a vehicle body rear portion member that is made of iron and forms a vehicle cabin and a trunk, and
the panel member is a partitioning wall panel that is made of aluminum and partitions the vehicle cabin and the trunk.

* * * * *